United States Patent [19]

Rawlinson et al.

[11] Patent Number: 5,490,255
[45] Date of Patent: Feb. 6, 1996

[54] EXPEDITED EXECUTION OF PIPELINED COMMAND HAVING SELF-ORDERING OPERAND PROCESSING REQUIREMENTS

[75] Inventors: Stephen J. Rawlinson, Sunnyvale; Christopher I. W. Norrie, San Jose, both of Calif.

[73] Assignee: Amdahl Corporation, Sunnyvale, Calif.

[21] Appl. No.: 814,878

[22] Filed: Dec. 26, 1991

[51] Int. Cl.⁶ ........................................... G06F 9/30
[52] U.S. Cl. ........................ 395/375; 364/DIG. 1
[58] Field of Search .................. 395/375; 340/172.5

[56] References Cited

U.S. PATENT DOCUMENTS

| | | | |
|---|---|---|---|
| 3,949,379 | 4/1976 | Ball | 340/172.5 |
| 4,945,511 | 7/1990 | Itomitsu et al. | 395/375 |
| 5,109,495 | 4/1992 | Fite et al. | 395/375 |
| 5,136,696 | 8/1992 | Beckwith et al. | 395/375 |
| 5,148,529 | 9/1992 | Ueda et al. | 395/375 |
| 5,325,495 | 6/1994 | McLellan | 395/375 |

*Primary Examiner*—Parshotam S. Lall
*Assistant Examiner*—Viet Vu
*Attorney, Agent, or Firm*—Fliesler, Dubb, Meyer & Lovejoy

[57] ABSTRACT

A pipelined computer which process operand data through a sequence of D,A,T,B,X and W stages includes a sidetrack queue. Data which exits the B stage prematurely, before the X stage is ready to immediately process such data, is held over in the sidetrack queue and presented to the X stage at a later time. The sidetracking mechanism is used to speed processing of rate-variable operand-consuming instructions such as the EDIT and EDMK commands.

20 Claims, 6 Drawing Sheets

EXPEDITED EXECUTION OF PIPELINED COMMAND HAVING SELF-ORDERING OPERAND PROCESSING REQUIREMENTS

BACKGROUND OF THE INVENTION

1. Field of the Invention

The invention is generally directed to digital computers. The invention is more specifically related to the execution of pipelined commands in which operands from first and second data sets are to be fetched from memory and presented sequentially to an execution unit for processing in an order or manner or at a rate specified by at least one of the fetched operands.

2a. Cross Reference to Micro-fiche Appendix

This application includes listings of two interacting computer programs, one for operating an instruction unit (IU) and one for operating an execution unit (EU). The listings are respectively provided in accordance with 37 C.F.R. §1.96 as microfiche Appendix A comprising _14_ frames (not counting title and target frames) distributed on a first sheet of microfiche and microfiche Appendix B comprising _26_ frames (not counting title and target frames) distributed on a second sheet of microfiche and incorporated into the specification by reference.

The assignee of the present application claims certain copyrights in said computer program listings. The assignee has no objection, however, to the reproduction by others of the listings if such reproduction is for the sole purpose of studying them to understand the invention. The assignee reserves all other copyrights in the program listings including the right to reproduce the computer programs in machine-executable form.

2b. Cross Reference to Related Patents

The following U.S. patents are assigned to the assignee of the present application and incorporated herein by reference:

(A) U.S. Pat. No. 3,840,861, DATA PROCESSING SYSTEM HAVING AN INSTRUCTION PIPELINE FOR CONCURRENTLY PROCESSING A PLURALITY OF INSTRUCTIONS, issued to Amdahl et al, Oct. 8, 1974;

(B) U.S. Pat. No. 4,244,019, DATA PROCESSING SYSTEM INCLUDING A PROGRAM-EXECUTING SECONDARY SYSTEM CONTROLLING A PROGRAM-EXECUTING PRIMARY SYSTEM, issued to Anderson et al, Jan. 6, 1981;

(C) U.S. Pat. No. 4,654,790, TRANSLATION OF VIRTUAL AND REAL ADDRESSES TO SYSTEM ADDRESSES, issued to Woffinden, Mar. 31, 1987;

(D) U.S. Pat. No. 4,661,953, ERROR TRACKING APPARATUS IN A DATA PROCESSING SYSTEM, issued to Venkatesh et al, Apr. 28, 1987;

(E) U.S. Pat. No. 4,685,058, TWO-STAGE PIPELINED EXECUTION UNIT AND CONTROL STORES, issued to Lee et al, Aug. 4, 1987;

(F) U.S. Pat. No. 4,752,907, INTEGRATED CIRCUIT SCANNING APPARATUS HAVING SCANNING DATA LINES FOR CONNECTING SELECTED DATA LOCATIONS TO AN I/O TERMINAL, issued to Si, et al. Jun. 21, 1988;

(G) U.S. Pat. No. 4,802,088, METHOD AND APPARATUS FOR PERFORMING A PSEUDO BRANCH IN A MICROWORD CONTROLLED COMPUTER SYSTEM, issued to Rawlinson et al, Jan. 31, 1989; and (H) U.S. Pat. No. 4,855,947, MICROPROGRAMMABLE PIPELINE INTERLOCKS BASED ON THE VALIDITY OF PIPELINE STATES, issued to Zmyslowski et al, Aug. 8, 1989.

3. Description of the Related Art

Pipelined architectures are employed in high-performance computer systems such as the Amdahl model 5890 or Amdahl model 5995A mainframes to speed the processing of program instructions and related data.

A pipelined computer system may be visualized as a series of interconnected pipe segments where each pipe segment has an inlet for receiving a flow of input data, a midsection for processing inflowing data and an outlet end pumping processed data out to one or more next succeeding pipe segments.

Efficiency and throughput are said to be advantageously optimized in a pipelined system when the midsections of all pipe segments in the system are continuously and simultaneously kept busy processing data, and as a result, they are all producing usable output data for immediate consumption by their respective, next-succeeding pipe segments. When this occurs, data moves through the pipeline as a relatively continuous flow. No pipe segment is left idly waiting by for operations to complete in a preceding pipe segment.

Pipelined computer systems can be constructed with one or more processor units. Each processor unit in such a system may be visualized as being composed of two main pipe segments: an instruction unit (I-unit) and an execution unit (E-unit).

The E-unit contains operand-processing means for processing one or more operands in accordance with a microinstruction when such operands are delivered to the E-unit in conjunction with the microinstruction.

The I-unit contains operand-fetch/delivery means for fetching operands and delivering them to the E-unit in conjunction with corresponding microinstructions.

Operands cannot be fetched and delivered haphazardly. Among the things to be considered during operand fetch and delivery are how to time operand deliveries so that operands arrive at the E-unit in timely conjunction with specific microinstructions and how to order operand fetches so that deliveries will comply with specific orderings when such orderings are required.

By way of example, consider how operands are delivered to an Arithmetic Logic Unit (ALU). The operand-processing means of an E-unit typically includes an (ALU) for performing arithmetic computations.

When two operands are delivered to the ALU in conjunction with a microinstruction which says "add", the ALU processes the operands and produces a result equal to their sum. Operand ordering is not important in this case. If the same operands are instead delivered to the ALU bundled with a microinstruction which says "subtract", not only is the result different but the order in which the operands are delivered becomes important because one operand will serve as the minuend while the other serves as the subtrahend.

In many pipeline architectures, the I-unit is given primary responsibility for not only fetching instructions and their corresponding operands but also for delivering them to the E-unit in the form of immediately-executable bundles of data. Each bundle can be pictured as a package consisting of a microinstruction and/or one or more operands arranged in an appropriate order for immediately carrying out an accompanying microinstruction or a previously delivered microinstruction.

To meet its responsibility, the I-unit typically includes: (a) fetch means for fetching instruction words and operands from memory and storing them in local registers; (b) decode means for decoding each instruction word into a series of microinstructions; (c) packaging means for bundling or aligning each microinstruction with a corresponding one or more operands (if any); and (d) delivery means for sequentially delivering each bundle to the E-unit in an appropriate and timely order. Results from the E-unit are returned to (e) a receiving means of the I-unit and forwarded therefrom to (f) a storage means of the I-unit for storage in main memory or local registers.

An I-unit flow-control program is stored in a control store of the I-unit for controlling the activities of the I-unit and for telling the I-unit when it should fetch a next operand or instruction from memory and for further telling it which operands it should bundle with which microinstructions as it delivers them to the E-unit.

Under optimum conditions, the fetch means of the instruction unit (I-unit) is continuously kept busy sequencing through locations of the processor's local memory (cache memory), fetching instructions (opcodes) and/or corresponding data words (operands) out of the local memory. The decode means of the I-unit is simultaneously kept busy decoding already-fetched instructions and generating a corresponding series of microinstructions. The packaging means of the I-unit is simultaneously kept busy aligning or bundling each prefetched operand with an already-generated, corresponding microinstruction. The delivery means of the I-unit is simultaneously kept busy continuously delivering ready-to-execute bundles of data to the E-unit.

A control store of the E-unit stores an E-unit flow-control program which coordinates the activities of the E-unit with those of the I-unit, telling the E-unit when and how it should respond to each delivered microinstruction and its associated operands.

Under optimum conditions, as the I-unit continuously delivers ready-to-execute bundles to the E-unit, the operand-processing means within the E-unit should be accepting each bundle and immediately processing the operands of that bundle according to their microinstruction. Simultaneously, an outlet portion of the E-unit should be outputting result signals derived from already processed operands to other parts of the machine in accordance with the I-unit flow-control program.

One advantage of such a continuous flow scheme is that data-processing resources within the E-unit do not have to wait idly by while precursory operations such as memory fetches, instruction decoding, or the pairing of microinstructions with associated operands, occur. The I-unit performs these operations ahead of time and presents immediately executable packages of data (each having a microinstruction and/or associated operands) to the E-unit.

It takes a finite amount of time for the I-unit to output address signals to its associated memory and to fetch operands. It takes a finite amount of time for I-unit to decode each instruction. And it takes a finite amount of time for the I-unit to align (bundle) each fetched operand with an associated microinstruction. This puts constraints on the ability of the I-unit to respond to immediate needs of the E-unit.

If continuous throughput is to be maintained in the pipeline, the I-unit flow-control program has to predict ahead of time what bundle of operands and microinstruction the E-unit will next need for every machine cycle. As long as the I-unit flow-control program continues to correctly anticipate the needs of the E-unit, the I-unit can begin its job of fetching appropriate operands ahead of time and the I-unit can continue to deliver immediately-executable packages of data to the E-unit according to a just-in-time delivery schedule. Correspondingly, the E-unit can continue to receive and process the delivered signals at a peak operating speed and the overall throughput of the pipelined system advantageously remains at a peak level.

If, on the other hand, the I-unit flow-control program is unable for some reason to deliver an immediately-executable bundle of signals to the E-unit just as the E-unit finishes processing a previously delivered bundle, the utilization of resources within the E-unit becomes less efficient. Pipeline throughput and/or efficiency becomes disadvantageously degraded.

A number of conditions can place the I-unit in a state where it is unable to deliver an immediately-executable bundle of signals to the E-unit just as the E-unit becomes ready to accept the bundle.

As an example, consider what happens when the I-unit flow-control program intentionally delays the I-unit from incrementing an operand pointer to point a next needed operand and from then fetching the new operand and pairing that new operand with a microinstruction next-to-be delivered to the E-unit. The E-unit is disadvantageously caught waiting for the I-unit as the I-unit later increments its pointer, fetches the operand and delivers it to the E-unit.

This typically occurs when the I-unit needs to wait until the E-unit finishes executing a first bundle of data before the I-unit can determine from the execution results of that first bundle, whether the I-unit should increment its operand pointer. A double-wide gap develops in the continuity of the usable data flowing through the pipeline. Not only does the E-unit have to stand by idly while the I-unit completes its operand-fetch operations, but the I-unit has to also idle uselessly while the E-unit completes execution of the precursory data bundle.

With regard to the above example, there is a variation of particular interest here. It is one where the I-unit begins to fetch a first operand and immediately thereafter the I-unit has to decide, based on the execution results of that first operand, what second operand it should next begin to fetch for next processing in the E-unit. The I-unit has to wait for the first operand to make its way through the entire length of the I-unit to the E-unit and for the results from the E-unit to return before the I-unit can determine what second operand is to be fetched and bundled with the next microinstruction. Then, the E-unit has to wait in turn while the second operand moves through the entire length of the I-unit. Such a waste of time is undesirable.

To appreciate the above problem more specifically, consider the sequence of operands shown by the below DIAGRAM-1. The operands are to be delivered to the E-unit in the illustrated left-to-right order.

DIAGRAM-1

$$\text{E-unit} \leftarrow -- \underset{1}{[PB]}, \underset{2}{[PB]}, \underset{3}{[PB]}, \ldots,$$

$$\underset{n-1}{[PB]}, \underset{n}{[PS]}, \underset{n+1}{[PB]}, [PB], \ldots$$

Each bundle is represented by the bracketed symbol, "[_]". Every bundle contains two operands (represented by letters inside the [_] symbol) which are to be delivered to the E-unit in conjunction with a corresponding microinstruction (not shown). The symbol "P" represents a "pattern" operand. "S" represents a "source" operand. "B" represents a "blank" or "don't care" piece of data. For microinstructions having a "B" in a particular position of their respective bundles, it is not important what data is being held in that "B" position.

Instructions like the EDIT and EDMK (Edit/Mark) instructions of the IBM 390/ESA mainframe computer are examples of operations which can generate a series of bundles having such "pattern" and "source" operands. (A detailed description of the EDIT and EDMK instructions may be found in IBM ESA/370 Principles of Operation, Rev. SA22-7201-0, pages 8-6 to 8-10.)

The leftmost bundle in DIAGRAM-1 (referenced as the bundle at position number 1) is the first in time to be delivered to the E-unit. It is to be noted that all bundles shown in DIAGRAM-1 contain the operands P and B, except for one bundle at position number "n". That bundle contains the P and S operands. The three dot symbol ". . ." preceding bundle "n–1" indicates a repetitious series of [PB] bundles.

The decision to place the [PS] bundle at position "n" is not made until after the [PB] bundle at position "n–1" is processed by the E-unit. Until the bundle of position "n–1" is processed, neither the I-unit nor the E-unit know that the [PS] bundle is to be next delivered to the E-unit. It is also possible that a [PB] bundle might be required at position "n".

(Artisans familiar with the IBM EDIT and EDMK instructions will recognize this explanation to be rather simplistic. Actually, for the case of the EDIT and EDMK instructions, each "P" and "S" is considered as an individual bundle and it is not until after the E-unit has received and processed the "P" at position "n" of the above DIAGRAM 1 that the E-unit can decide it next needs to receive an "S" operand.)

Under a conventional approach, the I-unit flow-control program instructs the I-unit to wait for the E-unit to finish processing each bundle before it fetches a next operand from memory, and before it completes assembly of the next bundle and before it delivers that next bundle to the E-unit.

From a timing perspective, the delivery stream heading toward the E-unit appears as shown in the following DIAGRAM-2.

DIAGRAM-2

$$\leftarrow - \frac{[PB]}{1} \text{ (dly) } \frac{[PB]}{2} \text{ (dly) } \frac{[PB]}{3} \text{ (dly)} \ldots \frac{[PB]}{n-1} \text{ (dly) } \frac{[PS]}{n} \text{ (dly)} \ldots$$

Each delay, "(dly)", in the above operand delivery stream is, at a minimum, equal to the length of time it takes for the I-unit to fetch the "S" operand of the [PS] bundle and to deliver the same to the E-unit.

(For the case of the IBM EDIT and EDMK instructions, it is more accurate to illustrate the delay as being interposed between each "P" and its following operand, as in the symbol: [P (dly) B], but for the sake of initial simplicity, we show delays inserted between [PB] bundles in DIAGRAM-2.)

The total delay penalty for processing the bundles of positions 1, 2, 3, . . . , n–1, n, . . . will be a corresponding multiple of the single delay time, "(dly)". When the number of bundles to be processed in the sequence grows, the total time penalty also grows.

A better approach is needed.

SUMMARY OF THE INVENTION

According to the invention, a side-track "pipe" or queue is provided within the E-unit or at the juncture of the I-unit outflow and the E-unit inflow for temporarily storing data which exits the I-unit prematurely. The E-unit pulls prematurely delivered data out of the sidetrack queue as it becomes required.

When such a sidetrack mechanism is provided, the I-unit is free to fetch operands prematurely and to drop them into bundles positioned downstream of (ahead of) the actual bundles that the same operands will ultimately belong in at the time they are processed in the E-unit.

The I-unit does not have to pause undecidedly before each operand fetch and to wait for the E-unit to process previously fetched operands. Instead, the I-unit can start each operand moving down the pipeline stream without regard to whether the present bundle or a later, upstream, bundle is the bundle into which the operand will ultimately have to be packaged before the E-unit processes that operand. Over short bursts of time, the I-unit can deliver certain operands (e.g., S-type operands) to the E-unit at a rate faster than the rate at which the E-unit consumes such operands.

One advantage of such a sidetrack scheme is that long time delays no longer have to be inserted into the execution of instructions which have self-ordering operands or operands which are to be consumed at self-defined rates. Another advantage is that the E-unit has immediate access at different times to pre-fetched data. Data which is output out-of-order from the I-unit, or at a rate which is not immediately acceptable for the E-unit, does not have to be held up in the I-unit or reprocessed through the I-unit. The E-unit does not have to wait for the I-unit to be re-primed with new operand data when a premature operand fetch has occurred.

One contemplated usage of the invention is to speed the processing of operand consumption rate-variable instructions such as the EDIT and EDMK instructions.

BRIEF DESCRIPTION OF THE DRAWINGS

The below detailed description makes reference to the accompanying drawings, in which.

DETAILED DESCRIPTION

Figure 1A:
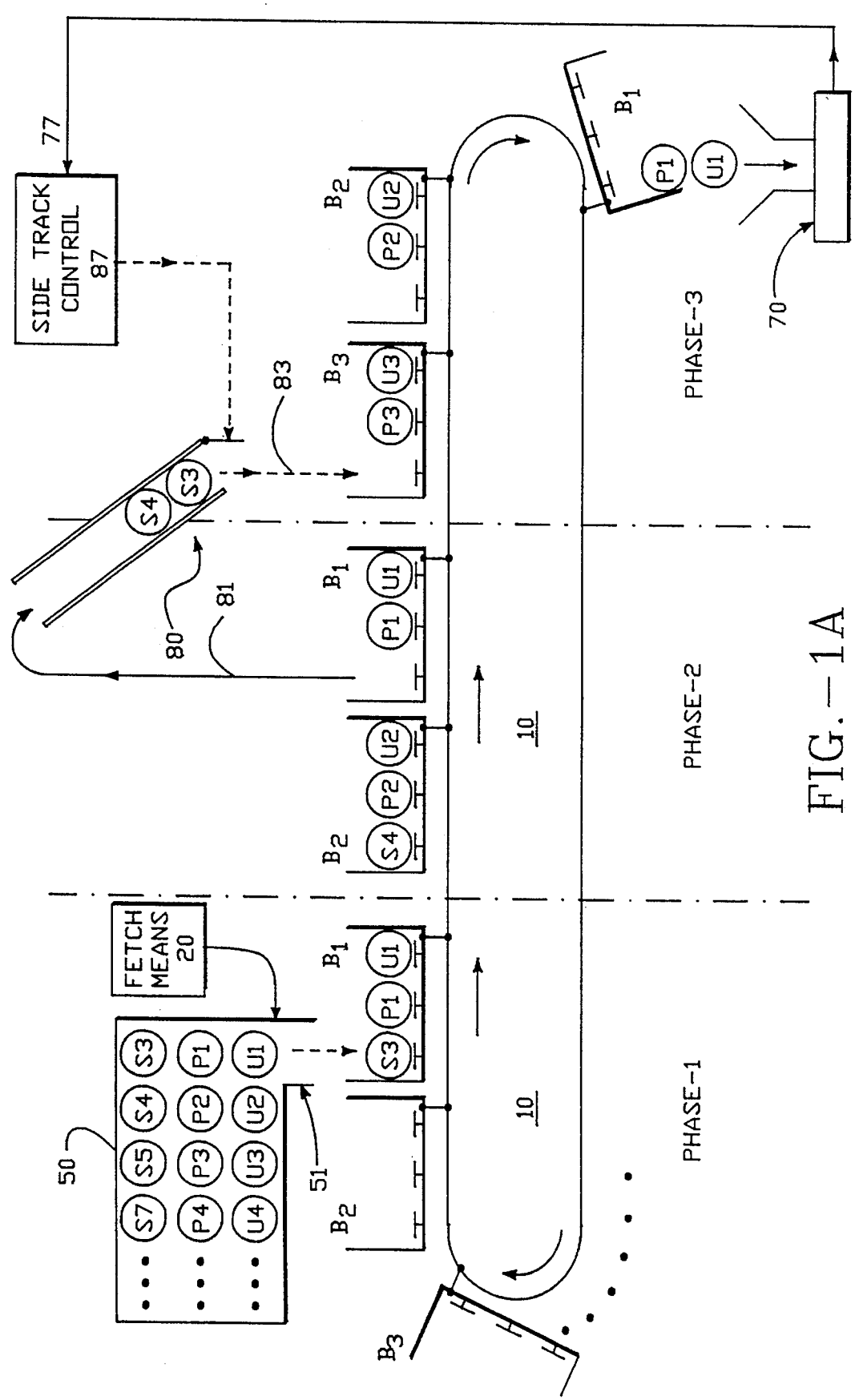
FIG. 1A is a conceptual diagram of a first pipeline architecture in accordance with the invention.

A more detailed look at the architecture of a pipeline will help facilitate the understanding of how a last moment decision regarding data ordering or operand consumption rates can happen and how waiting for this decision introduces undesirable gaps into the operand delivery stream of the pipeline.

In this part of the description, we will first consider a previously-known five stage synchronous pipeline architecture and afterwards, a six-stage pipeline in accordance with the invention.

In the five-stage architecture (e.g., that of an Amdahl model 5890 mainframe), each instruction and its corresponding microinstructions, and its further corresponding operand or operands, flow into and through a series of specialized pipeline stages referred to as D,A,B,X,W.

Data flow through the DABXW architecture can be pictured as having two components: a set of minor flows moving vertically into the D,A,B and X stages, and a major flow moving left-to-right through the DABXW stages. The minor vertical flows can be visualized as four tributary streams supplying instructions, operand specifications, operand addresses and microinstructions respectively into the tops of the D,A,B and X stages. Corresponding outputs of the D,A,B and X stages flow together to form the larger data river which moves in the left to right direction through the sequence, D,A,B,X,W.

Another way to picture signal flow through the DABXW structure is to imagine a continuous-flow assembly line having a main conveyer belt moving left-to-right through the DABXW stations and subsidiary conveyor belts feeding assembly subcomponents to the D, A, B and X stations on a just-in-time basis.

A memory unit (M-unit) can be further visualized as overlapping the D, A, B and W stages and connecting to them for respectively supplying instruction words (object code level) to the D-stage, for receiving operand-specifying addresses from the A-stage, for responsively returning operand data words through the B-stage to the X-stage and for receiving and storing result data from the W stage.

Each of the D,A,B,X and W stages includes a clocked front-end register and tail-end combinatorial logic. The front-end register of each stage captures nonsynchronous data output by the tail-end of a more upstream stage and forwards the captured data to the combinatorial logic of its own stage in synchronism with a next-occurring clock cycle. The combinatorial logic then processes the synchronized data during a remaining part of the clock cycle and outputs result data downstream to the front end of the next stage. The conventional DABXW structure processes data primarily according to a left-to-right serial protocol. It takes at least five clock cycles for any one bundle of data to work its way down the pipeline from the front end of the D-stage through the X-stage and finally out of the tail end of the W-stage where the corresponding results of the executed bundle are output.

If any part of an execution bundle has to be tagged as invalid during its transit through the pipeline (e.g., because of an interruption), or if any bundle part is otherwise rendered non-usable (e.g., because it is incorrectly positioned within the data stream), the data-processing resources within each of the D, A, B, X, W stages will end up having to idle uselessly for at least one clock cycle each.

This comes about because of the serial nature of the conventional pipeline. The term "bundle part", incidentally, is used here to refer collectively to opcodes, microinstructions, operands or any other related signals that flow through the pipeline and ultimately define each bundle of immediately-executable signals that converge in the X-stage.

The D-stage (decode stage) of the conventional DABXW structure is used for receiving pre-fetched instructions out of memory (M-unit), for temporarily retaining each received instruction, and for decoding the instruction to generate one or more corresponding microinstructions therefrom.

Some instructions have operand specifying portions for identifying one or more operands that are to be processed in conjunction with the generated microinstructions. If such portions exist, the D-stage generates operand specifying signals indicating that the specified operands need to be fetched from memory. The D-stage has internal counters (pointing registers) for pointing to and keeping track of operands that are to be associated with each instruction or each microinstruction.

As instruction decoding commences, and microinstructions begin to flow to the X-stage, the D-stage simultaneously pumps operand specifying signals to the following A-stage.

The A-stage (address stage) presents previously received operand specifications to an input port of the M-unit (memory unit). As new addresses enter the address input port of the M-unit, the B-stage (operand buffer stage) simultaneously fetches previously addressed operands from an output port of the M-unit, checks for data integrity and forwards the operands to the X-stage.

The A-stage includes address registers which store the operand specifications received from the D-stage. These address registers can be incremented at each machine cycle to sequence through a series of operand addresses if desired.

As each microinstruction reaches the front end of the X-stage, the B-stage delivers the corresponding operand data for that microinstruction into the X-stage front end. The X-stage front end combines (bundles) these signals, aligns them with a next received clock pulse, and delivers them to the mid-section of the X-stage (execution stage) for immediate execution therein during the next machine cycle.

As each new microinstruction and its operands (if any) arrive at the front end of the X-stage, already-processed bundles (result data) simultaneously shift out of the tail end of the X-stage to a subsequent W-stage (write stage) of the pipeline.

The W-stage attempts to write the result data either into areas of the memory unit or into local registers, as designated by the microinstruction.

Under ideal conditions, microinstructions and their respective operands, or results, flow through the corresponding D,A,B,X,W stages of the pipeline in an overlapping, staggered sequence as indicated by the below Flow-Diagram 1.

| FLOW-DIAGRAM 1 | | | | | | | | | | | |
|---|---|---|---|---|---|---|---|---|---|---|---|
| Instruction / | Cycle | 0 | 1 | 2 | 3 | 4 | 5 | 6 | 7 | 8 | 9 |
| first microinstruction: | | D | A | B | X | W | | | | | |
| second microinstruction: | | . | D | A | B | X | W | | | | |
| third microinstruction: | | . | . | D | A | B | X | W | | | |
| fourth microinstruction: | | . | . | . | D | A | B | X | W | | |
| fifth microinstruction: | | . | . | . | . | D | A | B | X | W | |

An "offset" of just one cycle (indicated by a leading dot ".") separates the launching of each microinstruction to the X-stage and the launching of each corresponding operand specification from the D-stage into the remainder of the pipeline. By cycle number 4, the W-stage is busy storing the results of microinstruction number 1, while the preceding X-stage is simultaneously executing microinstruction 2 and stages B, A and D, are simultaneously busy fetching the operands which will be needed in the subsequent execution of microinstructions 3, 4 and 5. (While not shown, it is to be understood that microinstructions 6, 7, 8, etc. follow using the same offset-by-one sequence so that pipeline efficiency remains at maximum in subsequent machine cycles 5, 6, 7, etc.)

The efficiency of the pipeline remains at maximum as long as an unbroken stream of valid, useful data continues to move through each of the DABXW stages, and keeps each stage gainfully employed one machine cycle after the next. Consider what happens, in the hypothetical sense, if the D-stage, for some reason is allowed to output one or more "erroneous" operand specifications to the A-stage. A bubble of useless operand data corresponding to the "erroneous" specifications will develop and flow through the following A,B,X, and W stages; nonproductively tying up each of these later stages for at least one clock cycle as it moves through.

In some instances, the X and W stages can be programmed to simply ignore the nonproductive bubble, as it passes through them. The bubble moves out of the pipeline harmlessly, and the X and W stages resume productive work with the immediately following bundle of data that comes down the pipeline.

In other instances, it may be necessary to stop all work ongoing within the pipeline, to flush out all stages of the pipeline and to begin operations anew in all the stages (DABXW) because the erroneous bubble was allowed to enter the pipeline.

This latter condition is undesirable. Conventional pipeline operations are controlled so as to try to avoid it as often as possible.

The above phrase, "erroneous operand specification," is used here to indicate that the corresponding operand data is either non-useful at the outset or becomes non-useful as it progresses down the pipeline. An operand specification can enter the pipeline with the appearance of being non-erroneous and a change of status can occur after the operand specification has already been launched into the pipeline, suddenly making it erroneous.

By way of an example, suppose that the D-stage is allowed to increment one of its internal operand pointers and to prematurely launch a corresponding operand specification into the pipeline, when the X-stage is not yet finished executing an earlier-delivered microinstruction. When the X-stage completes execution, the results render the just launched operand specification useless. It may be necessary to halt the computer, clean out the entire pipeline, reset the D-stage pointer register back to its previous setting and begin all over again. This will waste many machine cycles.

To avoid this contingency, pipeline designers routinely introduce an operand launching delay (offset) of more than one machine cycle at points in the pipeline flow control of the I-unit where it is not clear, until after the X-stage finishes a downstream task, what operand specification should be next launched from the D-stage into the remainder of the pipeline. A flow diagram with such an offset has the appearance shown in the below Flow-Diagram 2.

| Instruction / | Cycle | 0 | 1 | 2 | 3 | 4 | 5 | 6 | 7 | 8 | 9 | |
|---|---|---|---|---|---|---|---|---|---|---|---|---|
| FLOW-DIAGRAM 2 | | | | | | | | | | | | |
| Fetch operand-one: | | D | A | B | X | W | | | | | | (Flow #1) |
| Fetch operand-two: | | . | . | . | . | D | A | B | X | W | | (Flow #2) |
| Store result: | | | | | | . | D | A | B | X | W | (Flow #3) |
| Fetch next data: | | | | | | | . | D | A | B | X | W |

In the above Flow Diagram 2, the pipeline designer has intentionally introduced an offset of 4-cycles between the launching of operand specifications for microinstructions one and two (Flow #1 and Flow #2). This is done because the results output by the X-stage in microinstruction flow number one (Flow #1) are needed to correctly specify the operand(s) needed by the X-stage in the second microinstruction flow (Flow #2).

Taken alone, the 4 cycle offset does not appear substantial; but when repeated over millions of instructions, it can add up to a substantial loss of machine time.

The problem is endemic to a certain class of computer instructions which can be characterized either as having self-defined operand consumption rates or as having self-ordering operand processing requirements. Such instructions are referred to below as rate/order-variable instructions.

Most multi-operand instructions can be viewed as specifying a fixed ordering of operand fetches and as further specifying a fixed consumption rate for each kind of operand. By way of example, it may be decided that for each subtraction operation, a first fetched operand will always serve as the minuend and a second fetched operand always serves as the subtrahend. For each consumed minuend there is a correspondingly consumed subtrahend. There is no possibility of a last moment switch as the operand data approaches the X-stage. So the 4-cycle offset illustrated in Flow Diagram 2 is not required.

However, in the case of rate/order-variable instructions, a first part of their execution determines the desired ordering of operands or consumption rate of operands to be next fetched for a latter part of the execution (assuming here that a conventional pipeline structure is being used). A multi-cycle offset is conventionally inserted between the first and second parts of the instruction execution flow so the E-unit can finish executing the first part and send result signals back to the I-unit telling the I-unit when and/or what operands are needed for execution of the second part.

The EDIT and EDMK (Edit and Mark) instructions of the IBM 390/ESA computer architecture are examples of rate-variable operand-consuming instructions which are a subset of the class of rate/order-variable operations.

According to the operation rules of the EDIT and EDMK instructions, the computer is expected to fetch a first set of operands (so-called "pattern" codes) from a first area of memory at a first rate, a second set of corresponding operands (so-called "source" codes) from a second area of memory at a second rate (where the second rate is variable relative to the first rate), and to present the fetched data to the E-unit in a manner which pairs certain source codes to certain pattern codes in accordance with a pairing algorithm defined by control codes dispersed within the first area of memory.

When rate/order-variable instructions (e.g., EDIT, EDMK) execute according to previously known methods, the I-unit is forced to idle uselessly over many cycles while it waits for signals to come back from the E-unit to tell it (the I-unit) what delivery rate or ordering of operand data is next desired. As already explained, this type of stall is highly disadvantageous.

The present invention provides methods and structures for eliminating this problem.

Figure 1B:
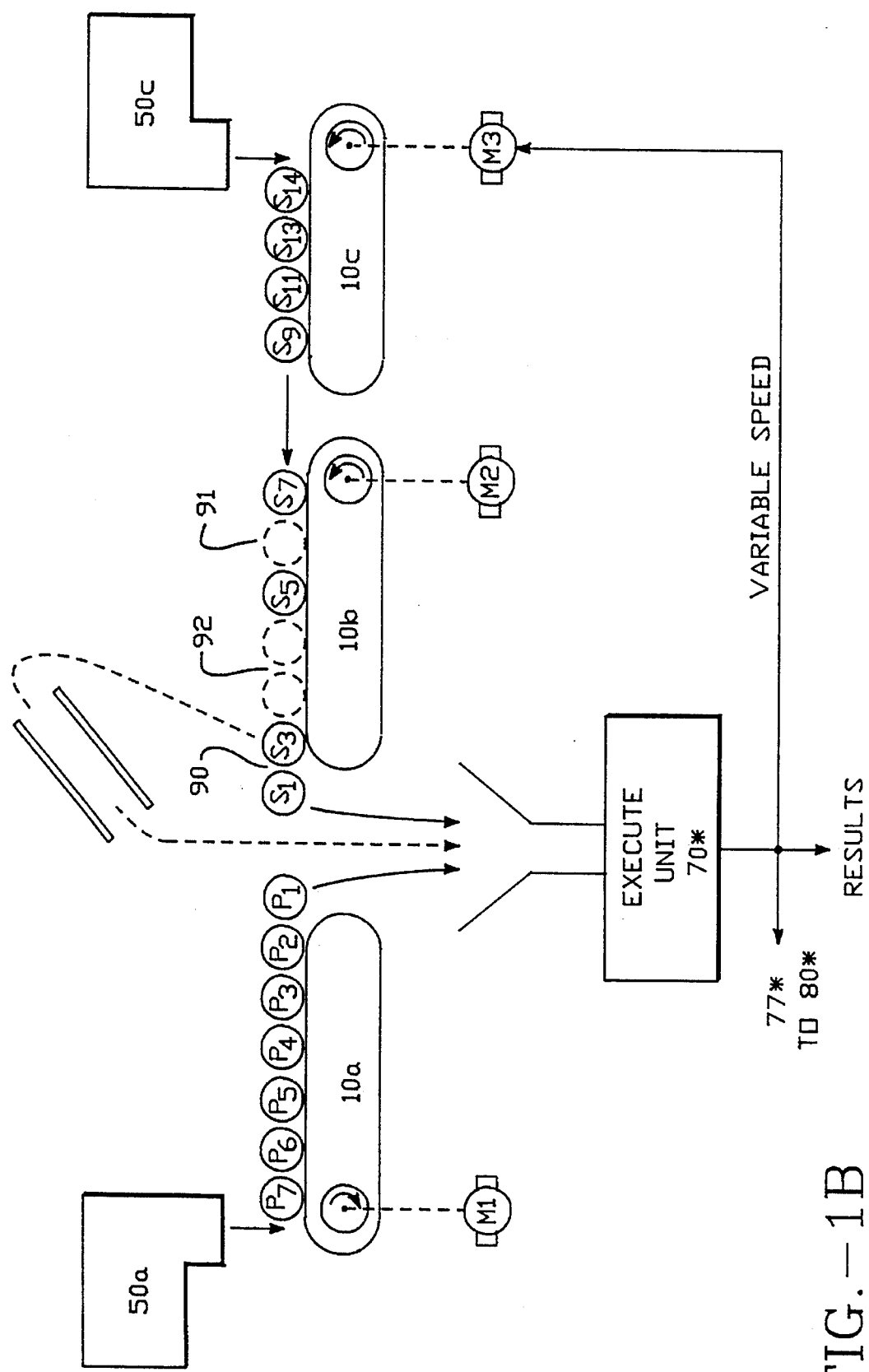
FIG. 1B is a conceptual diagram of a second pipeline architecture according to the invention.
Figure 1C:
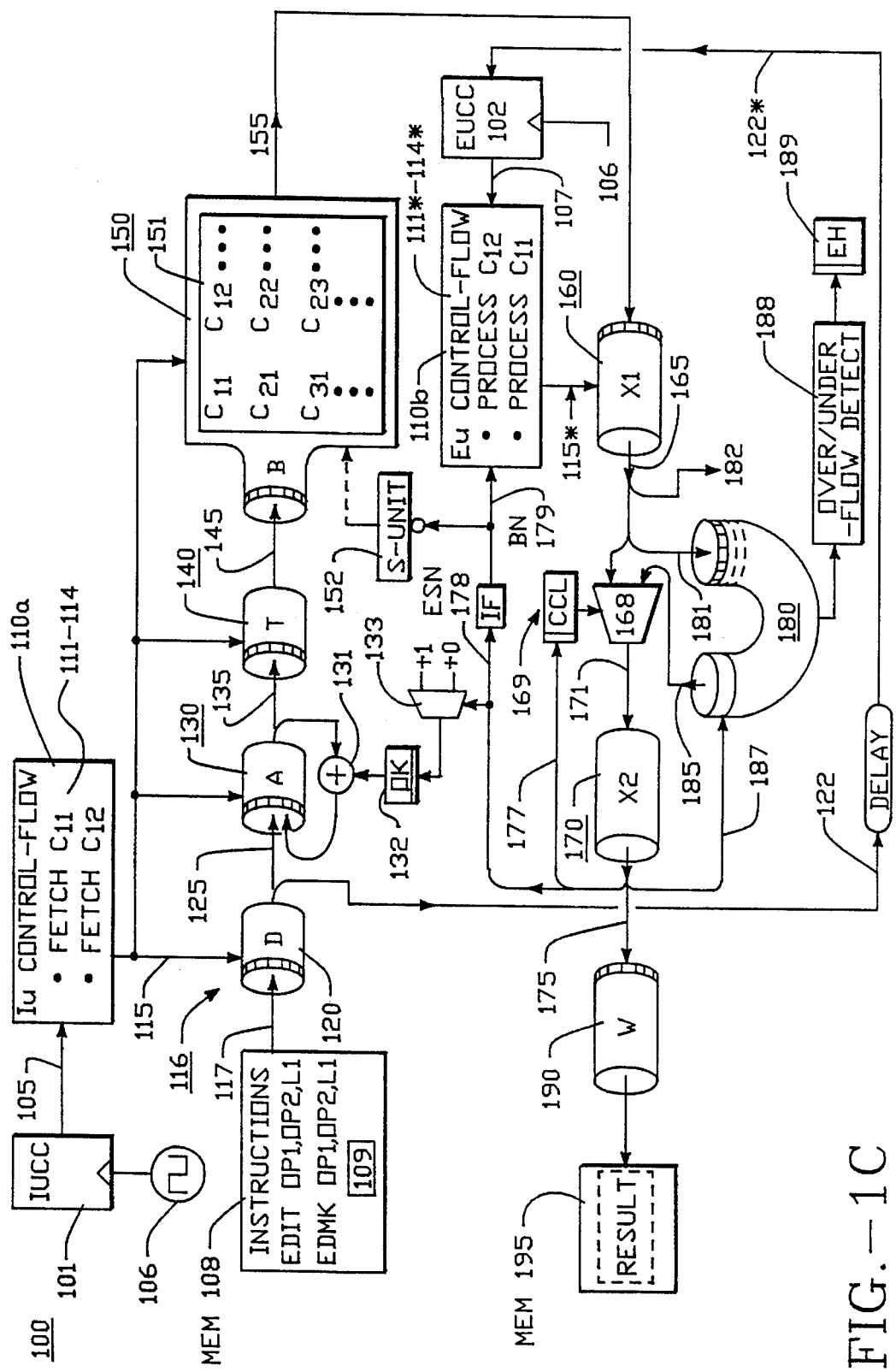
FIG. 1C is a block diagram of a third pipeline architecture in accordance with the invention.

FIG. 1A is a conceptual diagram showing how the problem is overcome in accordance with a first, simple embodiment of the invention. FIG. 1B is a block diagram of a second, more complex embodiment which will be described later on. FIG. 1C is a diagram of an even more complex, preferred embodiment which will be described thereafter.

Referring to FIG. 1A, an assembly line metaphor is used to represent the operand fetch and delivery mechanisms which deliver immediately-executable data bundles to the E-unit in one machine cycle after the next.

FIG. 1A is divided spatially and time-wise into three parts.

A first part of FIG. 1A, labelled as PHASE-1, shows a front loading portion of the assembly line at a first point in time, as data items are being loaded into successive pallets or "bins" labelled, $B_1$, $B_2$, $B_3$, etc.

A second part of FIG. 1A, labelled as PHASE-2, shows a middle portion of the assembly line at a second, later point in time, wherein the same bins, $B_1$, $B_2$, etc. are already filled with data items and the order of some of the data items is about to be rearranged while the assembly line continues to run.

A third part of FIG. 1A, labelled as PHASE-3, shows a tail-end, unloading portion of the assembly line at a later, third point in time, where rearranged data items are being unloaded from the same successive bins, $B_1$, $B_2$, $B_3$, etc. into a data-processing unit (executing unit) 70. Referring to the PHASE-1 portion of FIG. 1A, element 50 represents a storage unit which stores various items of data including: microinstructions, P-type operands and S-type operands. Each microinstruction is represented as a ball labelled with a microinstruction identifier of the form, $U_x$, x being an arbitrary integer here. Each P-type operand is represented as a ball labelled with an identifier of the form, $P_x$. Each S-type operand is represented as a ball labelled with an identifier of the form, $S_x$. It is not necessary to assign any meaning to the P-type and S-type operands at this point, but if helpful, they can be thought of as "pattern" and "source" bytes associated with the IBM EDIT and EDMK instructions.

Although the U, P and S-type balls within storage unit 50 are shown as being aligned in successive columns each containing three balls, one from each type, it is to be understood that such an alignment does not necessarily exist within the address space of storage unit 50. It is illustrated as such to expedite appreciation of the invention.

Storage unit 50 has a throughput-constrained outlet port 51 through which a fetch-initiating means 20 extracts three balls at a time (e.g., $U_x$, $P_y$ and $S_z$, where x, y and z can be different or equal integers). Fetch-initiating means 20 decides which three balls (data items) will be extracted each time and it initiates a fetch process which deposits them into a passing-by empty pallet or bin, $B_x$. Each "bin" $B_x$ can be thought of as representing a bundle of data aligned to a specific machine cycle or, alternatively, as data moving through successive shift stages within the pipeline.

In the illustrated example, bin $B_1$ is shown just as it is moving beyond outlet port 51, having been filled with respective data items, $U_1$, $P_1$ and $S_3$. Bin $B_2$ is empty and is next approaching outlet port 51. Further empty bins, i.e. $B_3$, $B_4$, etc., follow in succession as indicated.

Each bin $B_x$ is attached to a continuously-moving data-conveying means 10. Means 10 is conceptually shown as an endless conveyor belt which rotates clockwise but it is to be understood as representing a synchronous data shifting means which is continuously clocked by a system clock signal.

Conveying means 10 simultaneously moves all of its plural bins, $B_1$, $B_2$, $B_3$, etc., bringing each bin $B_x$ (x is an arbitrary integer here) first past outlet port 51 in PHASE-1 for an initial downloading of data items, then in PHASE-2 and PHASE-3 past respective input and output positions 81 and 83 of a side-track queue 80 (to be described shortly) and finally, in PHASE-3, past an unloading point where a single microinstruction $U_x$ associated with bin $B_x$ is unloaded in conjunction with its corresponding operands (if any), $P_x$ and $S_x$, into a microinstruction executing unit 70 (represented as an open top hopper).

Within executing unit 70, the delivered microinstruction is executed in conjunction with its simultaneously delivered and corresponding operands, if any.

Some microinstructions can be executed without any accompanying operands. Some microinstructions need only one additional data item (operand) for execution. Other microinstructions may need more. Extraneous operands which happen to be delivered to the executing unit 70 simultaneously with a given microinstruction are ignored by the executing unit 70.

In FIG. 1A, each P-type or S-type operand which corresponds to and is necessary for completing the execution of a particular microinstruction $U_j$ (j is an arbitrary integer here) is identified by a like subscript, as denoted for example by $P_j$ or $S_j$. Each bin $B_j$ is similarly identified with the subscript of the microinstruction $U_j$ which it does or will ultimately deliver to the executing unit 70. Thus, bin $B_1$ ultimately has to deliver $U_1$ and $P_1$ to unit 70. $B_2$ has to deliver $U_2$ and $P_2$. $B_3$ has to deliver $U_3$, in conjunction with $P_3$ and $S_3$, and so forth.

In the PHASE-1 portion of FIG. 1A, bin $B_2$ is shown to initially have three empty slots or "supports" (T's), the rightmost one of which is dedicated for supporting a corresponding microinstruction $U_2$, and the other two being available for, but not being dedicated to, next carrying corresponding operands such as $P_2$ and $S_2$ (the latter operand is not shown). In practice, the three slots (supports) of bin $B_2$ can contain data before the bin reaches outlet port 51. They do not have to be empty. But since their contents will be overwritten as they pass under outlet port 51, they are pictured here as being, in effect, empty.

In the illustrated example, there is no S-type operand, $S_2$, corresponding to microinstruction $U_2$. The execution of microinstruction $U_1$ (and often its corresponding operand $P_1$) defines what additional operands will or will not correspond to that microinstruction $U_1$ and/or to later delivered microinstructions such as $U_2$. We assume here that operand $S_2$ will not be called for. For the sake of example, we define by hindsight what succession of data items are to be delivered over time to the executing unit 70. In practice, the succession is continuously defined over time by earlier executed microinstructions. The requirements of each successive data bundle to be delivered in this example to executing unit 70 are defined by way of the following DIAGRAM-3:

DIAGRAM-3

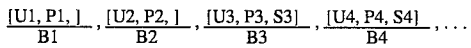

The data items of DIAGRAM-3 are supposed to be delivered to executing unit 70 in the recited left-to-right order, $U_1$ and $P_1$ first, then $U_2$ and $P_2$, and so forth. Each bundle is to be unloaded from its respective bin, as the bin passes by executing unit 70. There is no penalty for having additional, extraneous data items in "empty" slots of the bins since executing unit 70 will ignore them. Such null-effect data items are represented by blank spaces within the bracketed bundles of above DIAGRAM-3.

Note that for the first four bins $B_1$–$B_4$ which empty into hopper (execution unit) 70, the consumption rate for P-type operands is four operands ($P_1$, $P_2$, $P_3$, $P_4$) spread over 4 machine cycles while the consumption rate for S-type operands is only two operands ($S_3$ and $S_4$) spread over the same 4 machine cycles.

It is important to understand that, until the U portion and often times also the P portion of the bundle in bin $B_1$ are executed within unit 70, neither the fetch-initiating unit 20 nor the executing unit 70 know what ordering of operands or delivery rate of S-type operands should next follow. It is only through our hindsight definition of the results produced from the execution of $U_1$, $P_1$, and the results produced from executing successive data items that we can in PHASE-1 pre-label the S-type data item deposited into bin $B_1$ as $S_3$. The S-type item that is deposited into bin $B_1$ during PHASE-1 could just as easily have been labelled with an $S_1$ label (not shown) if an alternate example were considered or with an $S_2$ label (also not shown).

In PHASE-2 of FIG. 1A, a copy of the $S_3$ operand is automatically made at a copymaking position 81, dropped into a top end of a queuing tube (sidetrack pipe) 80, and allowed to roll down toward a bottom end of the queuing tube 80.

The copy of operand $S_3$ should move fast enough down the tube 80 so that the same operand $S_3$ will be available for deposit during PHASE-3 into the leftmost support of the next-following bin $B_2$. (Although the S-operand of bin $B_1$ is labelled $S_3$ in PHASE-1, it could just as easily have been labelled $S_2$ if an alternate to the present example were considered.)

The PHASE-2 portion of the illustration seems to indicate that the $S_3$ data item is removed or erased from bin $B_1$ at copy-making position 81. Actually it does not have to be so erased.

We know from hindsight that the leftmost item of data in bin $B_1$ will turn out to be extraneous to the execution of its bin companions, $U_1$ and $P_1$. So, even though data is present within that slot, we begin to illustrate the contents of the leftmost slot in bin $B_1$ as being a "blank" or null-effect data item after it passes position 81 of the PHASE-2 portion of FIG. 1A and it remains illustrated as such in the PHASE-3 portion. The same applies to the data item held in leftmost support of second bin $B_2$ as it passes by copy-making position 81 and to operands of other successive bins $B_3$, $B_4$, etc. (not shown). This illustrative gimmick should make it easier to understand the invention.

Referring to the PHASE-3 portion of FIG. 1A, it is seen that when bin $B_3$ passes an optional over-write point 83, a sidetrack control unit 87 operates a tube end door, and by its operation, decides whether the bottom item ($S_3$) in the sidetrack queue 80 should or should not overwrite the data in the underlying slot of a passing-by bin (i.e., $B_3$). The sidetrack control unit 87 receives decision-making information 77 from executing unit 70 after unit 70 has executed the contents of a more downstream bundle (e.g., [$U_1$, $P_1$]) and uses this information 77 to make its decision whether to deposit the next item of queue 80 into the bypassing bin.

In this example, as the leftmost slot of bin $B_3$ passes through overwrite position 83, the answer to the deposit/don't-deposit question will be yes and the copy of operand $S_3$ will be written into the leftmost slot (support) of bin $B_3$. $S_3$ drops out of tube 80 and the next queued item, $S_4$ shifts down to become the next item available for deposit. Thus, in this example, tube 80 functions as a FIFO buffer (first in is first out).

When third bin $B_3$ finally delivers its contents to executing unit 70, operand $S_3$ will follow operand $P_3$ as required, and it will be possible to immediately execute $U_3$.

When fourth bin $B_4$ (not shown) next passes through optional overwrite position 83, a copy of its corresponding operand $S_4$, which will have been made and dropped into queue 80 during previous PHASE-2, will be deposited into the appropriate slot of bin $B_4$.

Because queue tube 80 is available for retaining data items at a downstream part of conveying means 10, fetch-initiating means 20 is able to continuously initiate the process of fetching and depositing operands into bypassing bins without concern for the exact operand ordering or operand consumption rate which will ultimately be required downstream.

This is an important aspect of the invention. The only requirement is that fetch-initiating means 20 should not cause operands to drop into bins positioned upstream of (behind) the bins which those operands ultimately belong in.

Queue tube 80 maintains copies of operands which turn out to be prematurely deposited into bins positioned downstream of the bins carrying their corresponding microinstructions. When an appropriate bin passes by the lower end of tube 80, the copy is deposited into its correct position. If an unnecessary copy of an operand resides at the bottom of queue 80, the unnecessary copy can be discarded by shifting it out of tube 80 between bins.

With regard to the metaphor used in FIG. 1A, it is to be understood that the data items dropped onto the front end (left end) of conveyor means 10 are not necessarily in immediately executable form. They are processed or "transformed" over time as they move on conveyor means 10 such that they become immediately executable by the time they reach executing unit 70.

Another important aspect to be considered with regard to the embodiment shown in FIG. 1A is the gap between the time when unit 70 finishes executing a first bundle (e.g., $B_1$, and the time when the next downstream bundle (e.g., $B_3$) to be affected by that execution passes through over-write position 83.

Overwrite position 83 can be positioned anywhere downstream of the point where fetch-initiating means 20 launches a new data item onto conveyor means 10. As the timing distance between overwrite position 83 and execution unit 70 is shortened, the distance between the currently executing bundle (e.g. $B_1$) and the bundle where an overwrite is to take place (e.g. $B_3$ or $B_2$) can be correspondingly shortened. If the bottom end of tube 80 is brought directly over the mouth of hopper top 70, tube 80 can even deposit an S-type, operand directly into unit 70. This deposit can occur at the very last moment, as unit 70 finishes processing operand $P_1$, for example, and realizes from such processing that it next needs an $S_1$. The feedback time between unit 70 and unit 87 may be minimized in this case.

Many variations to the theme of FIG. 1A will become apparent to those skilled in the art once its fundamentals are appreciated.

By way of example, there could be two, three or more conveyor belts converging at the hopper opening of unit 70, with each conveyor belt separately delivering microinstructions and/or operands to the executing unit 70 and each conveyor belt having its own sidetrack pipe (tube) 80. If one of these conveyor belts delivers only microinstructions, and their sequence is non-alterable, there will be no need for a sidetrack pipe 80 over that belt. If another of the conveyor belts carries operands (e.g., pattern operands) whose order or downstream consumption rate does not vary, that conveyor belt will not need a sidetrack pipe either.

The conveyor belts mentioned here are to be understood as being metaphors for pipeline segments or shift means in a pipelined architecture.

As a further example of possible variations, the executing unit 70 of FIG. 1A might have multiple input ports, some being located further downstream of others. The multiple input ports (not shown) of the execution unit might be all fed with data carried by a central conveyor belt or they may be fed separately by individual belts or a combination of both. One of the input ports in the multi-input variation of the executing unit (not shown) may require advance delivery of a microinstruction and some operands. After the executing unit digests this advance data, it may generate partial result data indicating that a second of its input ports, located further downstream, requires delivery of an operand stored in a sidetrack pipe. The sidetrack pipe can be positioned to deliver this data item immediately thereafter, directly into the second input port of the executing unit.

As another example of a variation on the theme of FIG. 1A, there can be plural sidetrack pipes positioned over each conveyor belt. The plural sidetrack pipes of each conveyor belt can function to rearrange data at different time points along their respective conveyer belt.

Referring to FIG. 1B, one of the above-mentioned variations is illustrated. There are three conveyor means respectively labelled, 10a, 10b and 10c.

The first conveyor means 10a delivers P-type operands to execute unit 70*. The third conveyor means 10c delivers S-type operands to the second conveyor means 10b, which in turn delivers the S-type operands to the execute unit 70*.

First conveyor means 10a receives its P-type operands from supply source 50a and conveys them to execute unit 70* at a delivery rate determined by rate-determining means M1. (While means M1 is illustrated metaphorically as a motor, it is understood to represent a system clock generator of fixed frequency which controls the rate at which P-type operands move down conveyor means 10a to the mouth of execute unit 70*.)

Rate-determining means M2 determines the rate at which second conveyor means 10b delivers S-type operands to the mouth of execute unit 70* The second rate-determining means M2 operates at the same speed as the first rate-determining means M1 so that S-type operands are delivered to the execute unit 70* in synchronism with the P-type operands delivered by first conveying means 10a. Each S-type operand labelled $S_j$ is to be paired with a corresponding P-type operand labelled $P_j$ as both enter the mouth of execute unit 70*.

A third-rate determining means M3, which is responsive to the output of execute unit 70*, controls the delivery speed of third conveyor means 10c, as shown. The output of execute unit 70* indirectly determines (by modulating the speed of the third-rate determining means M3) what the average operands per N-cycles rate will be for S-type operands delivered from third conveyor means 10c to second conveyor means 10b.

Ideally, the delivery speed of the third conveying means 10c is controlled such that it positions S-type operands onto the second conveying means 10b in spaced apart relationship so that each S-type operand arrives at the mouth of execute unit 70* in phase with its corresponding P-type operand.

For the illustrated example, the third conveyor means 10c should have ideally, deposited the odd-numbered S-type operands onto the second conveyor means 10b such that there is a one-operand gap between each successive S-type operand. Such a one-operand gap is indicated at 91 between operands $S_5$ and $S_7$.

Unfortunately, the execute unit 705 does not know ahead of time, what spacing will ultimately be required between S-type operands of second conveyor means 10b. Thus, it is seen that an inappropriate two-operand space 92 has developed between operands $S_3$ and $S_5$, while no gap 90 is provided between operands $S_1$ and $S_3$. In essence, operand $S_3$ is being delivered prematurely, one position ahead of where it should have been.

Sidetrack pipe 805 is utilized, as explained earlier, to retain the prematurely delivered operand $S_3$ and to deliver it into the mouth of execute unit 70* at the appropriate, later time.

In one embodiment, all S-type operands are intentionally delivered prematurely onto second conveyor means 10b. They always flow from the left end of second conveyor means 10b into the sidetrack pipe 805, and from there they drop into the execute unit 705 at the appropriate time. Control signal 775 flows from the output of execute unit 705 to sidetrack pipe 80* to indicate when the sidetrack pipe 805 should deposit its retained copy into the mouth of execute unit 70*.

If it is found that sidetrack pipe 805 is about to overflow, because the execute unit 705 is not consuming S-type operands as fast as the second conveyor means 10b is delivering them, the third conveyor means 10c is temporarily slowed or halted. The slowed or halted operation of conveyor 10c is maintained until a state is reached where sidetrack pipe 80* is losing more S-type operands to the execute unit 70* than it is obtaining from the second conveyor means 10b. If this is allowed to continue, the sidetrack pipe 80* will become empty.

However, when the sidetrack pipe 80* is approximately half empty. (the execute unit 70* is coupled to pipe 80* to detect this condition), the third conveyor means 10c is restarted or its rate is increased such that it begins to send fresh S-type operands to the second conveyor means 10b at a faster rate. The number of S-type operands then begins to grow or at least remains level within the sidetrack pipe 80* rather than continuing to diminish.

The first and second conveyor means, 10*a* and 10*b*, continue to run at a steady pace while the speed of the third conveyor means 10*c* varies.

Referring to FIG. 1C, a block diagram of a preferred pipelined structure 100 in accordance with the invention is shown. This embodiment 100 has a sidetrack pipe 180 positioned to deliver operands directly into a second execution unit input port (inlet of the X2 section) located downstream of a first input port (X1 input) of the same executing unit 170, as will shortly become apparent. Microinstructions come to the execution unit along a conveyor means (Eu-Ctrl store) separate from that which delivers corresponding operands.

Portions labelled D, A, T, B and W (120, 130, 140, 150, 190) represent parts of an I-unit (not fully shown). Portions labelled X1 and X2 (160, 170) represent parts of an E-unit (not fully shown). The D,A,T,B,X,W portions define a six-stage pipeline 116 extending through the I-unit and the E-unit.

In structure 100, instructions enter the D-stage 120 of the pipeline 116 from a memory section 108 along path 117. Among the instructions in memory 108 is an EDIT instruction of the form:

EDIT OP1, OP2, L1 where OP1 is an operand-specifying parameter identifying the start of a field of P-type operands, OP2 is an operand-specifying parameter identifying the start of a field of S-type operands and L1 is an operand-specifying parameter defining the length of the P-type operand field. Memory section 108 stores plural fields 109 of operands, any of which can be pointed to by the EDIT instruction.

An automatically incremented first micro-code counter (IuCC) 101 supplies micro-address signals 105 to a first flow-control storage unit (I-unit flow-control) 10*a*. These address signals 105 arrive in synchronism with pulses provided from a running clock 106.

The first flow-control storage unit 110*a* supplies corresponding control signals to the D, A, T, and B portions of the I-unit for instructing the I-unit when to begin fetching a next instruction or operand from memory 108 and what to do with it. Flow control instructions can be delivered repeatedly from storage unit 110*a* in the form of a program loop or non-repeatedly from a serial segment of program code. Branch, loop or Get-next (+1) addressing commands come to the IuCC 101 from a variety of sources including a later-described X2 section 170.

When the D-stage receives and decodes an instruction from memory 108, the D-stage 120 also initiates 122 a corresponding set of later-timed execution operations in the E-unit for handling the decoded instruction. A delayed version 122* of the initiating signal 122 is delivered to the E-unit control mechanism 110*b*.

An automatically incremented second micro-code counter (EuCC) 102 responds to the delayed D-stage initiation signals 122* and supplies a series of micro-addresses 107 to a second flow-control storage unit (E-unit flow control) 110*b*, again in synchronism with pulses provided from the clock 106. The second flow-control storage unit 110*b* conveys corresponding microinstruction signals to the X1 and X2 portions (160, 170) of the E-unit instructing them on how to behave as operand signals 155 arrive from the I-unit and result signals 175 start pouring out of the X-stage.

The first flow-control storage unit 110*a* stores a sequence of I-unit control instructions, referenced here as 111, 112, 113, 114, etc. It supplies these one at a time through a pipeline inlet 115 to a decode stage (D-stage) 120 of the six-stage pipeline 116. The I-unit control instructions 111–114 (hereafter also "Iu-Ctrl instructions") enter inlet 115 sequentially in synchronism with the clock 106.

The second flow-control storage unit 110*b* stores a corresponding sequence of E-unit control instructions, 111*, 112*, 113*, 114*, etc., (hereafter also "Eu-Ctrl instructions"). It supplies (conveys) these one at a time to an execution stage (X-stage, 160 and 170 combined) of the six-stage pipeline 116 in synchronism with the clock 106. Instruction 111* is executed later in time than corresponding I-unit instruction 111 in order to account for pipeline latency.

The sampling of Iu-Ctrl instructions 111–114 illustrated in FIG. 1C are supposed to direct the computer to fetch first through fourth data items $C_{11}$, $C_{12}$, $C_{21}$, $C_{22}$ according to a first order, as recited. However, the corresponding Eu-Ctrl instructions 111*– 114* in the E-unit control store 110*b* ask the X-stage 160, 170 to process the fetched data items in a somewhat reversed order, $C_{12}$, $C_{11}$, $C_{22}$, $C_{21}$. Thus data item $C_{11}$ is being delivered to the E-unit before the E-unit is ready to process $C_{11}$. (In terms of an example based on the EDIT instruction, the $C_{11}$ would be a source code and $C_{12}$ would be a pattern code. Traditionally, the E-unit processes a pattern code before asking for a source code.) A sidetracking mechanism 168, 180 is included in the X-stage for handling prematurely delivered data items. It will be described in due course.

The six stages of pipeline 116 are respectively referenced as D, A, T, B, X and W. The X-stage is broken into respective first and second parts, X1 (160) and X2 (170) with the sidetrack mechanism positioned between the X1 and X2 sections.

Each stage is depicted as a cylindrical pipe section with shaded front end. The shaded front end of each pipe section (X2 does not have a shaded front end) represents a data-receiving register which is clocked by the clock 106. The unshaded back-end of each stage represents combinatorial logic for processing the register output data of its respective stage. (X2 consists entirely of combinatorial logic circuits.)

The first stage of the pipeline, the D-stage 120, decodes each fetched instruction 117 into a series of microinstruction specifying signals 122 and, if required, operand specifying signals 125.

The following address stage (A-stage) 130 and subsequent translating stage (T-stage) 140 convert each operand specifying signal 125 from an "effective" memory address into an operand-specifying physical address 145. With regard to T-stage 140, it can be observed that early machines did not have such a T-stage in their pipelines. There are advantages and disadvantages to having a T-stage. A discussion of these is outside the scope of the present invention.

It should be noted, however, that since the T-stage 140 is present, it now takes at least six machine cycles for each data bundle to make its way through the pipeline. An offset of at least 5 cycles rather than 4 would be disadvantageously required if the previous approach of FLOW-DIAGRAM 2 were used for handling rate/order-variable instructions. With the present invention, the extended length of the pipeline does not add extra delay to the execution of rate/order-variable instructions.

The A-stage 130 includes auto-incrementing logic 131 for automatically incrementing an address pointer held in its front-end register over successive clock cycles. An Iu-Ctrl signal 115 from flow-control 110*a* determines when the front end register of the A-stage 130 will be loaded with a new operand specification 125 from the D-stage or with an auto-incremented value from the increment logic 131.

An auto-increment control register (OK) 132 supplies a pre-loaded value such as +0 or +1 to incrementing logic 131 at the beginning of each D-stage cycle. During the D-stage cycle, the auto-increment logic 131 adds the OK value to an address signal output by the A-stage and, as an A-stage cycle begins, the auto-increment logic 131 loads the incremented value into a front end register of the A-stage 130. If a +0 value is placed in the OK register 132, increment logic 131 keeps returning the same value into the front end of the A-stage. IU control store 110a selects either the output of increment logic 131 or the output 125 of the D-stage as the value that the A-stage 130 will process in each A-stage cycle. The output 125 of the D-stage is selected when a new specification is to be loaded into the front end of the A-stage.

An ESN signal 178, output from X2 section 170, operates a load-control multiplexer 133 to selectively load the OK register 132 with one of two supplied values (usually +0 and +1) at each clock cycle (106).

The physical address signals 145 output from the T-stage 140 are supplied to an address input port of the B-stage 150. The B-stage 150 includes a cache memory unit 151 which stores an image of operand codes, $C_{11}$, $C_{12}$, $C_{13}$, etc. brought in from section 109 of memory 108 by way of a storage-control unit (S-unit) 152. The S-unit 152 responds to an inverted BN signal 179 which will be described later.

The B-stage 150 outputs an addressed one of its operand codes (also referred to as data items and referenced as 155) at each clock cycle to the next-following execution stage (X-stage), 160 and 170 combined.

Microinstruction execution begins in the X1 section 160 of the X-stage and completes in the X2 section 170. The output 165 of the X1 section 160 flows both directly toward an inflow portion 171 of the X2 pipe section 170 and also into a copy-making path 181 of a sidetrack pipe 180 for temporary storage therein.

A data selecting/combining mechanism 168 is provided for selectively choosing what data 171 will actually flow into the X2 pipe section in each machine cycle. Data selecting/combining mechanism 168 (hereafter combiner 168) can select either: (a) the output 165 of the X1 pipe section 160 or (b) output data 185 from the side-track pipe 180 or (c) a parallel combination derived from both (a) and (b). A combiner control latch (CCL) 169 commands the combiner 168, causing it to output one of the three optional outputs. A multiplexer or a set of tri-state bus drivers or similar signal routing/combining means may be used to implement the combiner 168. As will be seen shortly, the sidetrack pipe 180 and the combiner 168 can be controlled to alter the rate and/or order in which pre-fetched data items (operands) 155 are presented to the X2 pipe section 170. Work that has been earlier performed by the D, A, T and B-stages (120, 130, 140, 150) to present operand data 155 to the X-stage does not have to be thrown away if it is determined, at the time that an already-fetched data item 155 emerges from the B-stage 150, that the data item is emerging prematurely for processing by the X-stage (160 and 170 combined).

Instead, a copy 181 of the prematurely-delivered data item is held over in the sidetrack pipe 180 and the combiner control latch (CCL) 169 is later activated to selectively re-insert the sidetracked data item 185 into the inflow 171 of the X2 section 170 at the appropriate time. A control signal 177 supplied from the X2 segment to the combiner control latch (CCL) 169 controls the inflow selecting/combining activities of the combiner 168.

Another control signal 187 supplied from the X2 section 170 to the sidetrack pipe 180 shifts data items 185 out of the tail end of the sidetrack pipe and thereby creates room at the front end of the sidetrack pipe for more input 181. The sidetrack pipe 180 functions as a FIFO buffer (copied data 181 which is first-in becomes first-out data 185).

If the sidetrack pipe 180 fills up, such that there is no room for more output from the B-stage 150, excess side-track input 182 spills away into oblivion.

The X-stage can prevent this from happening by issuing shift commands 187 to advance data 185 out of the tail end of the sidetrack pipe 180. Alternatively, the X-stage 170 can send an ESN command signal 178 back to multiplexer 133 instructing it to load either a +0 value into the OK register 132 (to thereby stop the front end register of the A-stage 130 from auto-incrementing), or a +1 value (to thereby enable auto-incrementing). The loading of a +0 value into OK register 132 will prevent the pointer value in the front end of the A-stage 130 from skipping forward through operands $C_{ij}$ for whom there is no immediate room in the front end of sidetrack queue 180.

To assure that there are no pipeline design errors, an overflow/underflow detector 188 is provided to detect either overflow or underflow conditions in the sidetrack pipe 180. The overflow/underflow detector 188 sets an error history (EH) latch 189 upon detecting such a condition. EH latch 189 connects to an error-reporting system (not shown) which allows system designers to detect errors and trace back to their cause.

The X2 section 170 processes the operand code 171 delivered to it from the combiner 168 in accordance with corresponding microinstructions 115* supplied from the Eu control store 110b.

The X-stage (160, 170) outputs a control signal 177 which determines the state of the combiner control latch (CCL) 169.

As previously mentioned, the X-stage further outputs an ESN signal 178 which determines whether an operand specification earlier loaded from the D-stage 120 into the A-stage 130 will automatically incremented or whether a present value in the front end register of the A-stage 130 will be kept constant. Irrespective of the ESN signal 178, the I-unit microcode in storage 110a can alternatively command the D-stage 120, by way of control path 115, to load a new value into the A-stage in a next machine cycle.

Result data 175 from the X2 pipe section 170 flows to a write stage (W-stage) 190 of the pipeline which then attempts to store the result data (if valid) in an area of a memory unit 195 as specified by write address signals (not shown) supplied from the I-unit.

Although flow-control storage units 110a and 110b are separate in the illustrated embodiment 100, it is to be understood that they can also be part of a single high-speed control-store. Also, memory units 108, 151 and 195 can be part of a common memory area. In such instances, the result data output by the W-stage 190 can overwrite the operand data of memory area 109 or the instruction data of memory 108.

A sample use of the combiner 168 is illustrated by the commands in the following Instruction Execution Diagram 4.

| Instruction Execution Diagram 4 | | | |
| --- | --- | --- | --- |
| Instruction Number | For A-stage | For X2-section | For Track Switch |
| 111(*) | Get $C_{11}$ | . . . | . . . |
| 112(*) | Get $C_{12}$ | Process $C_{12}$ | Fm 160 |
| 113(*) | Get $C_{13}$ | Process $C_{11}$ | Fm 180 |
| 114(*) | Get $C_{14}$ | . . . | . . . |

As seen, the X2-section 170 is being asked to process operand codes $C_{11}$ and $C_{12}$ in Eu-Ctrl instructions 112* and 113* according to an order different from the get order which the A-stage receives from Iu-Ctrl instructions 111 and 112. (As an aside, it will be later seen in discussion of an EDIT instruction that the A-stage is asked to get an S-operand first and then a P-operand although the X2-section is asked to process the P-operand first and then, if needed, the prematurely gotten S-operand.)

Combiner 168 is first actuated to output the data 165 received from the X1 section 160 alone. When the first fetched operand $C_{11}$ enters the X2 section 170 from the X1 section 160, the EU control store 110b directs the X2 pipe section 170 to ignore it. (While not shown, it is understood that the EU control store couples to the X2 pipe section 170.) At the same time, the front end of sidetrack pipe 180 is strobed (by a strobe signal sent from IU control store 110b, connection not shown) and a copy of the initially-ignored operand $C_{11}$ is shifted into the front end 181 of the side-track pipe 180 as it moves out from the X1 section 160.

In the next machine cycle, combiner 168 is commanded (via a signal stored in CCL 169) to deliver the next-arriving $C_{12}$ operand by itself from the X1 section 160 directly to the X2 section 170 for processing. Then a cycle later, after the X2 section processes data item $C_{12}$, the X2 section 170 outputs a command signal 187 commanding sidetrack pipe 180 to release the stored operand $C_{11}$. The X2 section 170 outputs a further command signal 177 commanding the combiner 168 to retrieve the sidetracked copy of operand $C_{11}$ from output 185 and to deliver it to the X2 section in conjunction with the then arriving microinstruction 113*. Thus, the X-stage can process operand $C_{12}$ first and process the prematurely-delivered operand $C_{11}$ one cycle later. Alternatively, the X2-section 170 can process operand $C_{12}$ in parallel with the earlier-delivered operand, $C_{11}$. In a first X-stage cycle, $C_{11}$ passes through the X1 section 160 and shifts through sidetrack pipe (FIFO) 180, moving to the tail end of the sidetrack pipe 180 such that it will be ready for release as signal 185 one cycle later. At the beginning of a second X-stage cycle, the combiner control latch (CCL) 169 commands combiner 168 to select both the output 165 of the X1 section and the output 185 of the sidetrack pipe 180. $C_{12}$ and $C_{11}$ are delivered in parallel over line 171 to the X2 section even though $C_{11}$ was delivered to the X1 section before $C_{12}$.

The sidetracking mechanism 168, 180 of FIG. 1C can be used to improve the throughput rate of rate-variable operand-consuming instructions such as the IBM system 390 EDIT and EDMK commands.

Figure 2A:
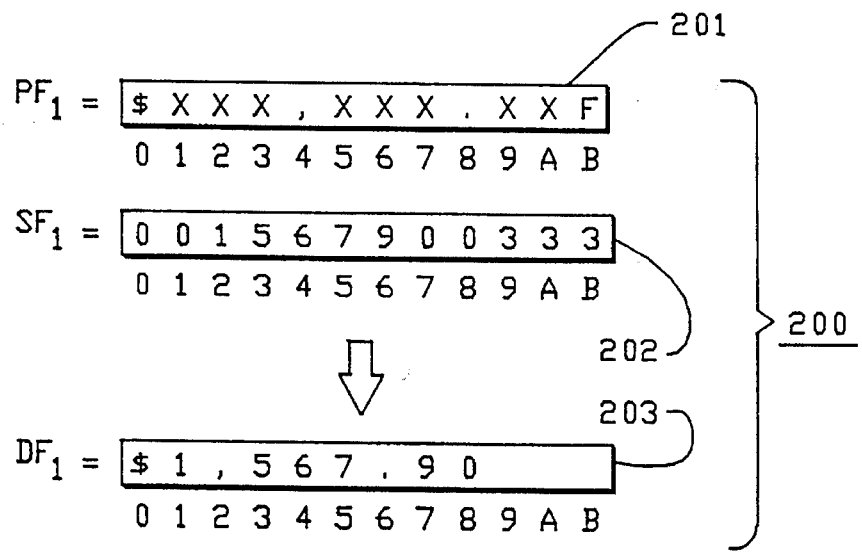
FIG. 2A illustrates a rate-variable operand-consuming edit command.

FIG. 2A illustrates a sample edit operation 200. It is to be understood that the below described "sample" edit operation 200 is not completely the same as the IBM EDIT or EDMK instruction. A certain amount of editorial license is used below to skim over the details of the IBM EDIT and EDMK instructions and to present a simplified description of what goes on during an edit operation. This is done for the sake of expedience. The invention is not limited in application to only the IBM instructions.

The sample edit operation 200 inputs two operand fields, 201 and 202, and outputs a third, result field 203. Operand codes are pulled out of input fields 201 and 202 and mixed into the results field 203. The rate at which data is consumed from the second operand field 202 varies relative to the rate at which data is consumed from the first operand field 201. The consumption rate of the second field 202 is determined by the contents of the first field 201.

The first operand field 201, which is also referred to here as the "pattern" field $PF_1$, contains a series of pattern codes stored in field areas individually referred to here as $P_{10}$, $P_{11}$, $P_{12}$, etc. The field areas can be 8-bit long "bytes" or 4-bit long "nibbles" or some other length as determined by a preselected coding scheme.

In the illustrated example, the pattern field $PF_1$ consists of the series of control codes: "$XXX,XXX.XXF". The "F" of pattern area $P_{1B}$ represents a field separator to indicate where the pattern field 201 ends. Other codes held in the pattern field may be generally described as a digit-selector "X", a combined (for this example) significance-starter and message character "S" and message codes ".", ",".

The second operand field 202, which is also referred to here as the "source" field $SF_1$ is defined by a series of areas $S_{10}$, $S_{11}$, $S_{12}$, etc. each containing a source code. In the illustrated example, the source field 202 contains the series of source codes: "001567900333".

The result of the sample editing operation 200 is illustrated at 203. The edited result 203 is placed in a "destination" field $DF_1$. The destination field 203 consists of destination areas $D_{10}$, $D_{11}$, $D_{12}$, etc. As seen, the result generated when edit operation 200 is performed using pattern field 201 and source field 202 is "$1,567.90". Message codes are mixed with source digits according to an order which is determined by the contents of the pattern and source fields.

It is seen in FIG. 2A that the pattern field 201, the source field 202 and the destination field 203 can be of different lengths. The computer steps through the fields according to a predefined protocol.

Execution of the sample edit operation 200 begins with a fetch of the first control code ("$") from pattern field 201. As execution proceeds, some pattern codes will be paired with source codes while others are not.

The opening "$" code of pattern area $P_{10}$, for example, is not paired with a source code. It instructs the computer to place a dollar sign code ($) at the first position $D_{10}$ of the destination field. We will also assume that it commands the computer to turn on a look-for-significant bit (not shown).

The computer then fetches a next control code from the pattern field area $P_{11}$ and inspects it.

Although not shown, assume for the moment that the very next fetched pattern code turns out to be a decimal point (".") instead of the illustrated "X". In such a case, the decimal point is immediately printed into the next area of destination field D1, and the look-for significant bit is reset. No companion piece of source code would yet be called for. Rather, a next pattern code would be fetched from the pattern field for processing.

Although not shown, assume alternatively that instead of a decimal point or the illustrated "X", a comma "," is found in pattern area $P_{11}$. In such a case, the comma is not printed into the next area of destination field D1, but rather ignored and the look-for-significant bit remains set. No companion piece of source code would be yet called for from the source field 202. Instead, a next pattern code would be fetched from the pattern field for processing.

On the other hand, if according to the illustrated example the next pattern code fetched out of area $P_{11}$ is "X" the computer next fetches a companion source code from area $S_{10}$, examines the companion source code and determines whether or not it is a significant digit. If the contents of $S_{10}$ is not a significant digit, it is discarded together with the corresponding "X" code of area $P_{11}$. The look-for-significant bit remains set and a next pattern code is fetched from the pattern field for processing.

If the source code fetched from area $S_{10}$ turns out to be a significant digit, the look-for bit is reset and the significant digit is printed into destination field $D_1$.

In the illustrated example, the pattern-source pairs, $P_{11}$–$S_{10}$ and $P_{12}$–$S_{11}$ are discarded because each of the source areas contains a nonsignificant digit. When the computer finally fetches the code of source area $S_{12}$ and recognizes its contents to be significant, the computer resets its search-for-significant bit (not shown) and writes the source code into destination area $D_{11}$ as dictated by the "X" code in area $P_{13}$.

The general approach of the edit operation as explained above is to always fetch a code from a pattern area $P_{ii}$ and process it first and then, only when needed, to fetch and process a companion source code from area $S_{jj}$. Code identifiers ii and jj are not necessarily the same and each is incremented on the fly, as needed. The rate at which identifier jj is incremented varies according to the peculiarities of the pattern field contents for that specific edit instruction.

The conventional ordering of code fetches for the example shown in FIG. 2A may be symbolized by the following Diagram 5. Diagram 5 is to be read in left to right and then top to bottom order. The sequence of fetch addresses is shown on the left and the accompanying data on the right.

DIAGRAM 5

| Address | Contents |
| --- | --- |
| $P_{10}$-(delay) | $ |
| $P_{11}$-(delay)-$S_{10}$ | X-0 |
| $P_{12}$-(delay)-$S_{11}$ | X-0 |
| $P_{13}$-(delay)-$S_{12}$ | X-1 |
| $P_{14}$-(delay) | comma |
| $P_{15}$-(delay)-$S_{13}$ | X-5 |
| $P_{16}$-(delay)-$S_{14}$ | X-6 |
| $P_{17}$-(delay)-$S_{15}$ | X-7 |
| $P_{18}$-(delay) | decimal point |
| $P_{19}$-(delay)-$S_{16}$ | X-9 |
| $P_{1A}$-(delay)-$S_{17}$ | X-0 |
| $P_{1B}$-(delay) | field terminator |
| $P_{20}$ | begin next pattern |

It is seen that conventionally the computer fetches a pattern code first, processes it, waits for the processing to complete (represented by "delay") and determines therefrom whether it needs to next fetch a source code. The computer fetches a next source code only when it is next needed, then a next pattern code and so on until the end of the pattern field is reached.

Figure 2B:
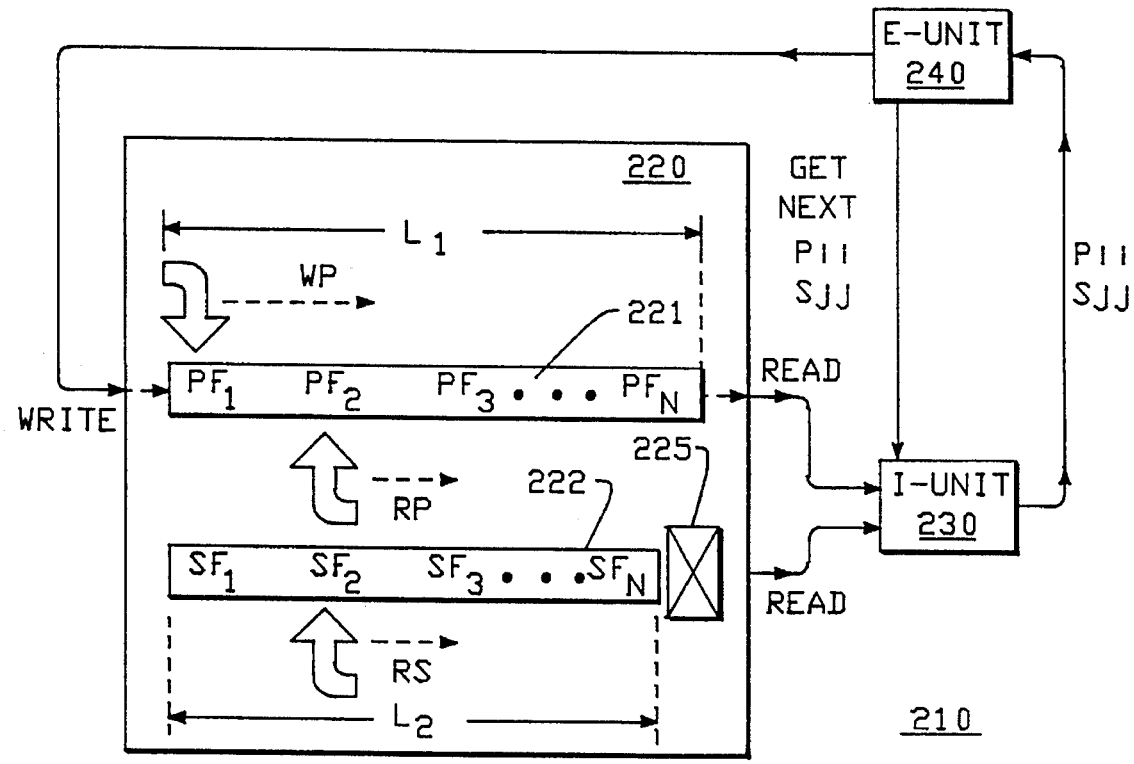
FIG. 2B is a block diagram illustrating how the edit command flows through a previously known pipeline structure.

Because the source field is sometimes shorter than the pattern field, the computer has to remember its last position in the source field. This is necessary to locate the beginning of a succeeding source field. As seen in FIG. 2B, source fields can be positioned one adjacent to the next and processed all at once. The "F" terminator codes in each of the pattern fields determine the lengths of the corresponding source fields.

FIG. 2B illustrates a computer 210 which executes the above editing sequence repeatedly on strings of adjacent control and source fields. This computer 210 is similar to previously known Amdahl Model 5890 and Model 5995A mainframes. (Unlike the simplified example, the Amdahl machines executed EDIT in full accordance with IBM Principles of Operation.)

The computer 210 includes a memory unit 220 configured to store a first block 221 of adjacent pattern fields, $PF_1$, $PF_2$, $PF_3$, ..., $PF_n$, and a second block 222 of adjacent source fields, $SF_1$, $SF_2$, $SF_3$, ..., $SF_n$, as illustrated.

The computer 210 further includes an instruction unit (I-unit) 230 for fetching control codes and source codes from the respective memory blocks 221 and 222, and supplying these codes to an execution unit (E-unit) 240. The E-unit 240 analyzes the fetched codes, sends result data to the memory unit 220 and instructs the I-unit 230 whether each fetched pattern code $P_{ii}$ needs to be paired with a companion source code $S_{jj}$ or whether a next pattern code $P_{ii+1}$ should be fetched next.

Using the illustrated example of FIG. 2B, an operation similar to the IBM ESA/390 EDIT will be described.

Each destination field $DF_i$ is written over in the same memory location as its corresponding pattern field $PF_i$. In other words, the data in the pattern block 221 is overwritten with result data as the operation executes.

All pattern fields $PF_1$–$PF_N$ and corresponding source fields $SF_1$–$SF_N$ are processed in a single execution of the edit command. The edit command includes a length specifier defining the length $L_1$ of pattern block 221 and two start of block specifiers which respectively point to the starting addresses of blocks 221 and 222. RP represents the read pointer for the pattern block 221. RS represents the read pointer for the source block 222. WP represents the write pointer for the pattern block 221. Source block 222 has a length, $L_2$, which is usually shorter than the $L_1$ length of pattern block 221.

A large "X" is drawn through memory area 225 to indicate, for the present example, that data in memory area 225 is not valid for read operations. Source block 222 happens to end just before the nonavailable memory area 225. If read pointer RP moves into memory area 225, and a read operation is attempted, a read exception flag will be raised to indicate that results derived from that read are invalid.

The I and E-units of FIG. 2B have the five stage DABXW structure earlier described. They execute pattern and source fetches according to the Flow #1 and Flow #2 lines of the above Flow-Diagram 2. A pattern fetch is executed first, then an offset of 4-cycles is interposed to give the X-Stage time to analyze the fetched data, and then, only when needed, a source fetch is executed. Read, analyze and write operations are pipelined through the I- and E- units to speed the execution of the EDIT command as it steps through all fields of the pattern and source blocks, 221 and 222.

A major disadvantage of pattern-first and source-second-only-when-needed approach is that the pipeline (230, 240) wastes 3 machine cycles waiting for each fetch and execute of a pattern code to complete before it can proceed forward. The total amount of idle time grows as more and more P and S fields are presented to the computer for processing.

Figure 3:
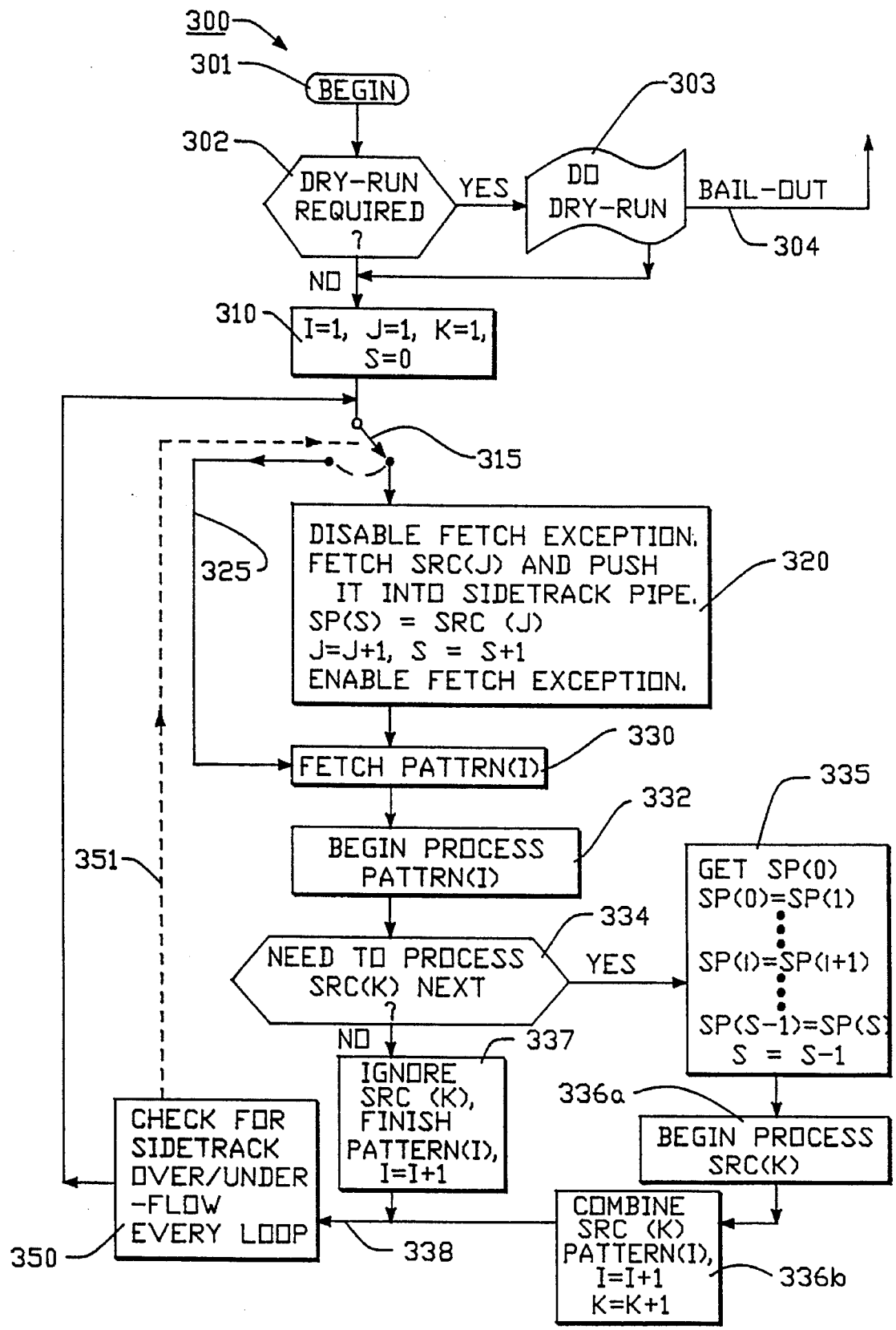
FIG. 3 is a flow chart illustrating how the edit command flows through a pipeline having a side-track pipe in accordance with the invention.

FIG. 3 and the below specification Diagrams 6 and 7 illustrate an alternative approach, in accordance with the invention, for performing the edit command. Here, a first set of Iu-Ctrl instructions are provided, instructing the I-unit to begin interlacing source code fetches and pattern code fetches and to send the respective operands to the E-unit without regard for the specific pattern-source pairings the E-unit will ultimately dictate when the E-unit later processes the codes. In fact, the first S-type operand fetched is sent to the E-unit before the first fetched P-type operand.

The side-tracking structure 168, 180 (FIG. 1) is used to properly pair source codes with their companion pattern codes after the pattern codes arrive at the E-unit.

In the flow chart of FIG. 3, an edit routine 300 begins at step 301. At step 302 a test is performed to see if a so-called "dry-run" (trial execution) is necessary.

A dry-run tests the validity of pattern and source code fetches out of memory without writing results back into memory. Attempts to fetch code out of non-available memory will activate exception-handling mechanisms. Conventionally, the activated exception-handling mechanisms are used to block a so-called "wet-run" (complete execution) where the EDIT instruction is fully carried out and results are written into memory.

It turns out that in most instances, already-obtained information maybe used to perform calculations that prove a dry run is not necessary (e.g., there will be no crossing of memory page boundaries during a wet-run). The source field length $L_2$ (see FIG. 2B) is guaranteed to be no larger than the pattern field length $L_1$. Given that $OP_2$ and $L_1$ are passed as parameters in the EDIT instruction, it is easily determined from these parameters whether a possibility exists for the source field ($L_2$) to extend into a memory area of unknown availability. The maximum source address, $OP_2+L_1$ should not be inside the "X" area 225.

A majority of the time, step 302 produces the "No" answer. The source field length $L_2$ typically is only a small fraction (e.g., 1/16th or less) of a memory page. So the chances of crossing a page boundary are small. (In one embodiment, page boundaries are 4K bytes apart and $L_2$ is limited to 256 bytes.) If the answer is yes in step 302, the dry-run is performed at step 303.

The "dry-run" 303 is a pseudo-execution of the EDIT instruction which substantially replicates the approach taken in the prior art with the exception that a 5 cycle offset is used for the 6-state pipeline instead of a 4 cycle offset. Since this is time consuming, there is no advantage gained if the dry-run 303 has to be performed every time routine 300 is run. However, as already noted, a majority of the time the answer at step 302 is NO and the time-consuming dry-run 303 is bypassed.

During a dry-run 303, result data is not written into the destination area (221, FIG. 2B) as it is in a wet-run. If there is a problem with fetching operand data out of a non-available memory area (e.g., 225, FIG. 2), this problem is flagged out during the dry-run and the actual wet-run is not performed. Instead, the edit routine bails out at step 304. Thus the source data (221, FIG. 2B) is not destroyed by an edit command which cannot complete due to a fetch exception.

Referring to next step 310, it should be noted that by the time the computer reaches this initialization step 310, it has already been established, mostly calculation and sometimes by performing a dry run, that the pattern block (221) and source block (222) are located in available memory and that a wet-run may proceed without invoking a memory fault for read and/or write accesses to necessary data contained within these blocks (221 and 222).

Pointer variables, I, J, K, are used here to reference the pattern and source data items respectively found at the output 165 of the X1 pipe, at the front end 181 of the sidetrack pipe and at the tail end 185 of the sidetrack pipe.

Stack pointer S, is used here to point to the top stack position SP(S) of the sidetrack pipe 180. SP(0) is the bottom of the stack from which output 183 is removed. [SP(0)] represents the contents of stack position zero.

In step 310, pointer variables I, J and K are initialized to one. Stack pointer S is initialized to zero.

Some of the next described steps of FIG. 3 occur concurrently. However, for the sake of simplified conceptualization and illustration they are presented below as if they occur in a serial format.

A mode selecting switch 315 is encountered immediately after step 310. The setting of mode selecting switch 315 is controlled by a later described step 350. Switch 315 is initially set as shown to guide the routine flow to step 320 rather than to bypass path 325.

In step 320, source code Src(J) is fetched first. A fetch-exception flag is intentionally forced to a false state. The fetched source code Src(J) is pushed into the front end 181 of the sidetrack pipe. This is denoted by [Src(J)] → [SP(S)] where the latter represents the contents of stack position SP(S). Variables S and J are then incremented.

In following step 330, pattern code Pattern(I) is fetched and forwarded to the X2-section 170. X2-section 170 begins to process the fetched pattern code in step 332.

The result of processing step 332 determines whether a source code is next required by the X-stage for combination with the fetched pattern code. This determination is indicated at step 334.

If a source code is next needed, combiner 168 is activated to pull the earlier-fetched source code from the tail end 185 of the sidetrack pipe (from stack position SP(0)) and to supply it in combination with its corresponding pattern code to the X2-section. This operation is indicated at steps 335 and 336a. In step 336a, the X2-section begins to process the source code SRC(K) gotten out of the sidetrack while it simultaneously continues the pattern code processing which began at step 332. In step 336b, the X2-section combines the processing of pattern and source codes, SRC(K) and PAT(I), and upon completion, flow indicators I and K are incremented and the process moves on to step 350.

Referring to step 335, it should be recalled that sidetrack pipe 180 functions as a FIFO. As the contents of stack position SP(0) are withdrawn to produce SRC(K) for step 336a, all the rest of the data items in the sidetrack pipe 180 shift down. This is indicated by [SP(1)] → [SP(0)], [SP(2)] → [SP(1)], . . . , [SP(S)] → [SP(S–1)]. The top of stack pointer, S, is then decremented to indicate that a source code has been shifted out of the sidetrack pipe and that the top of stack in the sidetrack pipe 180 has therefore been reduced by one.

The initial source code processing step 336a and the combined source and pattern processing step 336b both occur in the same machine cycle as initial pattern processing step 332. The processed source code Src(K) is one that had been earlier fetched, loaded into the front end 181 of the sidetrack pipe and forwarded to the tail end 185 of the sidetrack pipe. Pointer variable K is used here merely for identifying which prefetched source code SRC(J) is being processed in steps 336a, 336b and to indicate what next source code will be available for pairing, if so required, with a future pattern code.

If at step 334 it is determined that a source code is not needed for combination with the current pattern code, then the flow proceeds to step 337, where the processing of PAT(I) completes without a source code. Flow tracker I is then incremented in the flow chart to identify the next pattern code to be processed. Pattern-finishing step 337 completes in the same clock cycle as initial pattern-processing step 332. One cycle later, a next pattern code should be coming out of the X1 section 160 for immediate processing by the X2 section 170.

Routine 300 loops back through path 338 to mode switch 315 so that it can repeatedly fetch source and pattern codes in an interlaced manner. Respective pattern-and-source processing steps (332 and 336a,b combined) or pattern-only processing steps (332 and 337 combine) take place in successive machine cycles within the X-stage.

Not all pattern codes pair with source codes. At some point in time, an accumulation of not-yet paired source codes can begin to fill up the sidetrack pipe 180.

Step 350 is included in the loop of routine 300 to test for, and anticipate, an overfill condition. The value of stack pointer S is checked to detect either an upcoming overfill condition (e.g. S>8 if we assume a pipe 180 having eight slots) or an upcoming underfill condition (e.g. S<0).

If it is determined in step 350 that an overfill condition is shortly upcoming, switch 315 is operated (through connection 351) to select bypass path 325. Stack filling step 320 is now bypassed. Sidetrack depleting step 335 eventually starts to consume source codes out of the sidetrack pipe without any countering pushes of new source codes into the pipe 180 from bypassed step 320.

As the number of source codes in sidetrack pipe 180 dwindle, it is eventually determined in the sidetrack checking step 350 that an underfill condition is shortly upcoming. Mode switch 315 is again operated (through connection 351) to bring the source pushing step 320 back into the routine 300 loop. Step 320 now starts pushing new source codes into the sidetrack pipe 180 and continues to do so until it is once again taken out of the loop by checking step 350.

As already mentioned, the flowchart of FIG. 3 provides a relatively simplified, serial explanation of the processes taking place within pipeline 116. A more detailed description of the process is provided in the accompanying program listings of the accompanying microfiche Appendices A and B. A portion of the microfiche Appendix A is reproduced below in a somewhat modified form as Flow-Diagram 6 to further facilitate appreciation of the invention.

In the corresponding embodiment, the sidetrack pipe 180 is a FIFO buffer having a capacity for storing only eight (8) source codes. Eight is believed to be an optimum number for maximizing the price/performance ratio for carrying out the EDIT and EDMK commands, but other values can be used as well.

At each pass through checking step 350, the sidetrack pipe 180 can be as much as half full or half empty. When S reaches above the half-way full mark (S≧4), mode switch 315 selects bypass path 325. When S crosses below the half empty mark (S<4), switch 315 is actuated to include step 320 in the routine flow. The command for actuating mode switch 315 has to be issued before an over/under-fill actually occurs because it takes time for the auto-increment logic 131 (whose result becomes valid at the start of an A-stage cycle) to initiate or stop the delivery of new source codes from buffer 151 to sidetrack pipe 180. While bypass path 325 is selected, the auto-incrementing activity of increment logic 131 is effectively frozen and this keeps the RS pointer (FIG. 2B) in the correct place.

In the below microcode of Diagram 6, OK represents the contents of the auto-increment register 132 of FIG. 1B. ESN ("E-unit source needed") represents the control signal 178 sent to multiplexer 133, as earlier mentioned.

The same ESN signal 178 passes through an I-unit/to/E-unit interface (IF) to form a corresponding BN (Byte Needed acknowledge) signal 179. The BN signal 179 is a handshake acknowledgement passed from the I-unit to the E-unit informing the E-unit that the I-unit has received a source-needed request (ESN) signal 178 from the X2 section 170.

The I-unit periodically sends fetch requests to the S-unit 152. When it receives such a request, the S-unit 152 pulls new data out of mainstore memory (109) and adds it into buffer 151. The I-unit also sends an inverted version of the BN signal 179 to the S-unit 152. When more source code is NOT needed by the E-unit, the inverted BN signal functions to cancel a most-recent fetch request sent from the I-unit to the S-unit 152. This eliminates an unnecessary but possible delay which might be incurred within the machine if the S-unit 152 is allowed to proceed with a not-now needed data-addition to buffer region 151. The edit operation completes faster if the number of delays incurred by S-unit 152 operations are minimized.

W_XC is a latch which holds a fetch exception code. Normally, the W_XC exception code is set when a problem is encountered in transferring valid data from main memory through the S-unit 152 into buffer 151 or therefrom into the X1 section 160. However, as seen in the EDMK08(1) instruction of flow diagram 6, this exception code is forced to zero, indicating that no exception is present.

Microinstructions EDMK00 to EDMK05 are not shown in Diagram 6 because they handle the less-important dry-run bypassing aspect of the Edit/Mark command.

EDMK07(1) to EDMK09(1) represent a first loop through microinstructions EDMK07 to EDMK09. EDMK07(2) to EDMK09(2) represent a second loop through the same microinstructions. EDMK07(3) shows the start of a third loop.

Step EDMK07 (1) of the micro-routine tests the number of source codes accumulated in the sidetrack pipe 180. If the number is 4 or more, the ESN signal 178 that is output from the X-stage is reset. This loads a +0 value into the OK register 132. If the number of accumulated source codes is less than 4, ESN is set and that loads a +1 value into the OK register. Because of pipeline latency (3 cycles from A-stage to X-stage), the new value in the OK latch 132 does not stop or start new source codes from being pumped out of the B-stage buffer 151 until a number of cycles later (e.g. some 3 cycles later), just as the side-track pipe is about to overfill or underfill.

A method for handling the case of FIG. 2A in accordance with the invention is illustrated in next following Diagram 7. (Compare this to previous Diagram 5, noting that there are no delays between source and pattern fetches and also that $S_{10}$ is fetched before $P_{10}$.)

The accumulating pile of source codes in the sidetrack pipe is indicated in the rightmost column of Diagram 7. The computer fetches a source code first, then a pattern code without waiting, then a source code without waiting and so forth. When it later processes the first fetched pattern code, it determines therefrom whether it needs to also consume an earlier fetched source code from the side-track pipe or it alternatively fetches source codes and pattern codes from the B-stage without regard to their individual pairing until the end of all pattern fields is reached.

| | | FLOW DIAGRAM 6 | | | | | | | | | |
|---|---|---|---|---|---|---|---|---|---|---|---|
| Micro-instruct Name | Description of Prime Actions | | | | CYCLE No. | | | | | | |
| | | 0 | 1 | 2 | 3 | 4 | 5 | 6 | 7 | 8 | 9 |
| EDMK06 | Fetch 1st source code. | D | A | T | B | X | W | | | | |
| EDMK07(1) | Fetch 1st pattern code. Check sidetrack for | . | D | A | T | B | X | W | | | |

FLOW DIAGRAM 6

| Micro-instruct Name | Description of Prime Actions | _____ CYCLE No. _____ | | | | | | | | | |
|---|---|---|---|---|---|---|---|---|---|---|---|
| | | 0 | 1 | 2 | 3 | 4 | 5 | 6 | 7 | 8 | 9 |
| EDMK08(1) | over/under fill. 0 → W_XC Fetch 2nd source code. If EDIT GoTo EDMK07 | . | . | D | A | T | B | X | W | | |
| EDMK09(1) | Mark location. GoTo EDMK07 | . | . | . | D | A | T | B | X | W | |
| EDMK07(2) | Fetch 2nd pattern code. Process previous pattern code. 1 or 0 → OK 1 or 0 → ESN 1 or 0 → BN | . | . | . | . | D | A | T | B | X | W |
| EDMK08(2) | Fetch 3rd source code if ESN = 1 | . | . | . | . | . | D | A | T | B | X | W |
| EDMK09(2) | Mark location | . | . | . | . | . | . | D | A | T | B | X | W |
| EDMK07(3) | Fetch 3rd pattern code. Process previous pattern code. 1 or 0 → OK 1 or 0 → ESN 1 or 0 → BN If end of pattern field, then Exit to EDMK10 | . | . | . | . | . | . | . | D | A | T | B | X | W |
| EDMK10 | Mark location | . | . | . | . | . | . | . | . | D | D | D | D | D | A | T | B | X | W |

DIAGRAM 7

| Address | Contents | SidePipe |
|---|---|---|
| $S_{10}$-$P_{10}$ | 0-$ | +1 |
| $S_{11}$-$P_{11}$ | 0-X | +1 |
| $S_{12}$-$P_{12}$ | 1-X | +1 |
| $S_{13}$-$P_{13}$ | 5-X | +1 |
| $S_{14}$-$P_{14}$ | 6-comma | +2 |
| $S_{15}$-$P_{15}$ | 7-X | +2 |
| $S_{16}$-$P_{16}$ | 9-X | +2 |
| $S_{17}$-$P_{17}$ | 0-X | +2 |
| $S_{18}$-$P_{18}$ | 0-decimal | +3 |
| $S_{19}$-$P_{19}$ | 3-X | +3 |
| $S_{1A}$-$P_{1A}$ | 3-X | +3 |
| $S_{1B}$-$P_{1B}$ | 3-field terminator | +4 |
| $S_{1C}$-$P_{20}$ | next source code-next pattern code | |

By the time source area $S_{1B}$ is reached, there is an accumulation of 4 source codes in the sidetrack 180 ready to be processed in combination with a following field of pattern codes. The pattern field terminator is processed then the computer is ready to begin the next pattern field.

Referring to the nomenclature used in FIG. 2B, the source fetch pointer RS can increment sufficiently ahead of the pattern fetch pointer RP, so that by the time RP is within the pattern field $PF_N$, the source fetch pointer RS is already fetching data out of invalid area 225.

According to one aspect of the invention, fetch exceptions are ignored so that the algorithm can finish processing the last pattern codes without taking a program access exception.

It is known ahead of time, from the calculations made at step 302 (FIG. 3) that the source codes fetched out of invalid region 225 (FIG. 2B) will never be processed by the E-unit. They will simply move into the side-track pipe and will be discarded as the end of the last pattern field $PF_N$ is completed. The I-unit fetches them without stopping so that it can quickly fetch valid pattern codes which interlace with these invalid source codes.

Figure 4:
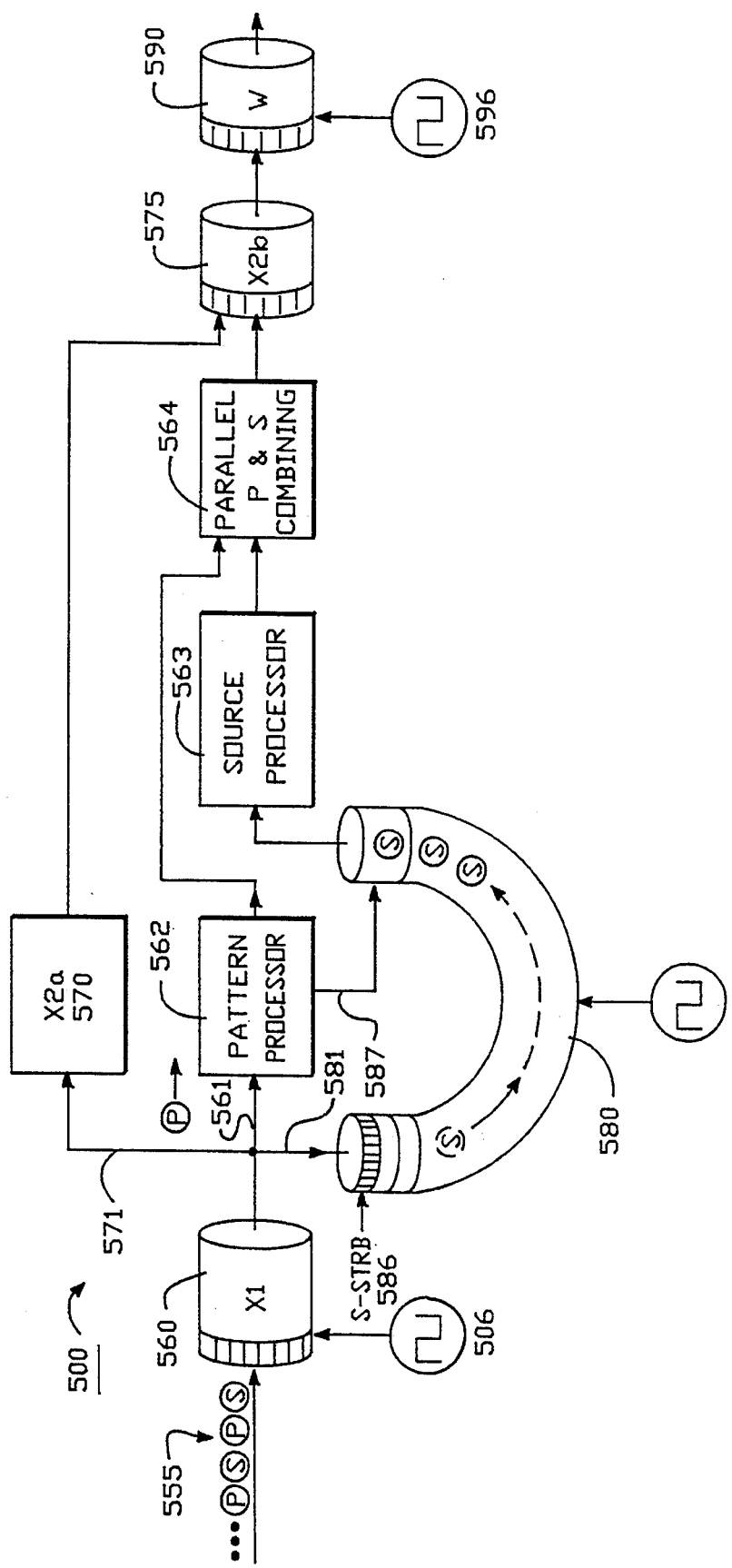
FIG. 4 is a block diagram of a preferred pipeline section in accordance with the invention.

Referring to FIG. 4, a preferred EDIT executing section 500 is illustrated. Source and pattern codes are supplied in interlaced manner to the X1 section 560 as indicated at 555, with each S-code being prematurely delivered ahead of its corresponding P-code. A X-stage clock generator 506 supplies clock pulses to the front end of the X1 section 560.

Signals output by the X1-section 560 move in parallel along respective paths 561, 571 and 581 to respective units 562, 580 and 570. Unit 580 is a side track pipe whose operations are synchronized to the X-stage clock 506. A microcode generated strobe signal (S-STRB) 586 indicates to the side track pipe 580 when a S-code data item is present on the output bus of the X1-section 560. At that time, the data item present on the X1-section output bus is latched into a front end of the side track pipe 580 and it quickly shifts from there to a tail end of the sidetrack pipe 580 as indicated by the dashed arrows. Side track pipe 580 functions as an FIFO.

Unit 562 is a pattern-code processor. Pattern processor 562 receives E-unit microcode instructions and responsively selects out pattern codes output from the X1-section 560 for processing. As processing proceeds within unit 562, pattern processor 562 determines whether or not the currently processed pattern code needs to be combined with a source code. If yes, a source-code needed signal 587 is sent to the tail end of sidetrack pipe 580 and the needed source code is supplied to a source pre-processor 563. The outputs of pattern pre-processor 562 and source pre-processor 563 couple to a parallel pattern and source combining unit 564.

If only a pattern code has to be processed, parallel processing unit 564 ignores code supplied from source pre-processor 563. It processes only the output of pattern pre-processor 562 and supplies the result to a X2b-section 575 of the execution unit.

If pattern and source codes are to be combined, parallel combining unit 564 utilizes the outputs of both the pattern pre-processor 562 and the source pre-processor 563 to supply a result signal to X2b-section 575. Because the X-stage performs operations other than EDIT, other signals from the X1-stage 560 move along line 571 through a X2a-section 570 and from there into completion section 575.

The output of completion section 575 moves to a W-stage 590 which is clocked by its own independent clock generator 596.

The interrelation between the units of FIG. 4 and the flowchart of FIG. 3 should now be apparent. Pattern pre-processing step 332 is performed in pattern preprocessor 562. Source pre-processing step 336a is performed in source pre-processor 563. Combined processing step 336b is performed in parallel processor 564.

Numerous modifications and variations will become apparent to those skilled in the art after studying the above disclosure. The above disclosure is to be taken as illustrative of the invention, not as limiting its scope or spirit.

By way of example, the sidetrack storage unit 180 does not have to be a FIFO. Any storage means for storing sidetracked data items may be used. The sidetrack storage unit 180 can have a storage capacity larger than the suggested one. The pipeline can have a number of stages more or less than that of the illustrated 6-stage pipeline.

Given the above disclosure of general concepts and specific embodiments, the scope of protection sought is to be defined by the following claims.

What is claimed is:

1. A pipelined system having an upstream end and a downstream end, the pipelined system comprising:
   (a) a downstream positioned execution unit for receiving microinstructions and one or more operands, time-aligned to corresponding ones of the microinstructions, for immediate execution in said execution unit;
   (b) an operand-storing unit for storing operands to be executed by the execution unit;
   (c) an upstream positioned fetch unit for initiating the fetching of operands from the operand-storing unit;
   (d) delivery means having an upstream end coupled to the upstream positioned fetch unit and a downstream end coupled to the downstream positioned execution unit for conveying operands fetched by the fetch unit to the execution unit;
   (e) side-track storage means, having an input end and an output end positioned downstream of the input end, for temporarily storing operands delivered to the input end and subsequently outputting the delivered operands from the output end, thereby sidetracking the operands delivered to the input end;
   (f) copying means, coupled to an upstream portion of the delivery means, for copying operands moving through the upstream portion of the delivery means into the input end of the side-track storage means so as to create side-tracked copies of said operands; and
   (g) deposit means for depositing side-tracked copies of premature operands that would have otherwise arrived at the execution unit prematurely, before the execution unit is instructed to process such premature operands, into either a downstream portion of the delivery means or directly into the downstream positioned execution unit such that the deposited copies arrive in the execution unit in time-alignment with the corresponding microinstructions that instruct the execution unit to process the deposited copies.

2. In a pipelined computer having an E-unit for receiving a stream of executable code delivered thereto and processing the same at a code-dependent rate, and an I-unit for fetching and delivering code to the E-unit, a method for processing code which is prematurely output by the I-unit before the E-unit is instructed to process that code, the method comprising the steps of:
   (a) providing a side-track pipe coupled to receive code output by the I-unit output, said side-track pipe being in addition to a main-flow pipe that delivers code fetched by the I-unit to the E-unit;
   (b) temporarily storing I-unit outflow data which the E-unit has not yet been instructed to process in the side-track pipe; and
   (c) at a later time, delivering the temporarily stored data of the side-track pipe to the E-unit for immediate processing therein.

3. The delivery delaying method of claim 2
   wherein the I-unit fetches first and second operands in the recited order and forwards them in said order for delivery to the E-unit;
   wherein, after the first and second operands are fetched, the E-unit generates an ordering signal instructing the E-unit to process the second operand before the first operand;
   wherein said step (b) of temporarily storing I-unit outflow data includes storing the first operand in the side-track pipe; and wherein
   said method further includes the steps of:
   not immediately processing in the E-unit, the first operand forwarded from the I-unit to the E-unit;
   processing in the E-unit, the second operand forwarded from the I-unit to the E-unit so that the E-unit begins to processes the second forwarded operand before processing the first forwarded operand; and
   later delivering the sidetrack stored first operand to the E-unit from the side-track pipe for processing within the E-unit.

4. The method of claim 3 wherein said steps are carried out for the processing of an EDIT or an EDMK instruction.

5. The method of claim 4 wherein the step of providing a side-track pipe includes setting the storage capacity of said side-track pipe to store no more than eight data items outflowing from the I-unit.

6. The method of claim 5 further comprising the steps of anticipating an approaching overfill or underfill condition in the side-track pipe and correspondingly halting or resuming said step (b) of temporarily storing I-unit outflow data in the sidetrack pipe as the respective overfill or unfill condition approaches.

7. The method of claim 4 wherein said EDIT or EDMK instruction is characterized by a pattern code whose processing in the E-unit determines what source code is to be next processed in the E-unit, the method further comprising the step of fetching the source code before the pattern code.

8. The method of claim 2 further comprising the steps of anticipating an approaching overfill or underfill condition in the side-track pipe and correspondingly halting or resuming said step (b) of temporarily storing I-unit outflow data in the side-track pipe as the respective overfill or unfill condition approaches.

9. The method of claim 8 wherein an approaching overfill or underfill condition in the side-track pipe is anticipated as the side-track pipe respectively becomes half or more than half full, and less than half full.

10. In a pipelined computer having an I-unit for supplying a stream of immediately executable code to an E-unit in accordance a first flow sequence although at times the E-unit requires the code to arrive in accordance with a different second flow sequence, a structure for delaying delivery to the E-unit of code prematurely processed by the I-unit before the E-unit is prepared to process said premature code, the structure comprising:

(a) sidetrack pipe means provided at a juncture where I-unit outflow data flows toward an E-unit inlet or downstream of said juncture, the sidetrack pipe means being provided for storing data;

(b) diverting means for diverting premature I-unit outflow data, which the E-unit is not yet prepared to process, to the sidetrack pipe means; and (c) switch means for delivering the stored data of the sidetrack pipe means to the E-unit in time-alignment with corresponding microinstructions.

11. A structure according to claim 10 wherein the switch means operates to supply a continuous stream of immediately executable code to the E-unit.

12. A structure according to claim 10 wherein the I-unit fetches code at a first rate and said E-unit consumes code at a second rate determined by the contents of a subset of the code fetched by the I-unit, wherein the second rate can be, over a relatively short time period, different from the first rate such that the I-unit fetches code prematurely before the E-unit is instructed to consume said premature code.

13. A pipelined system according to claim 1 wherein said delivery means is a continuous-delivery means for continuously conveying operands fetched by the fetch unit to the execution unit so that the execution unit can continuously process those of the delivered operands and deposited copies thereof that satisfy the needs of a then-executing microinstruction.

14. A pipelined system according to claim 13 wherein the side-track storage means is sized to continuously keep the execution unit supplied with operands.

15. A pipelined system according to claim 1 wherein the fetch unit causes operands to be fetched from the operand-storing unit at a first rate and said execution unit consumes operands at a second rate determined by the contents of a subset of the delivered operands.

16. A pipelined system having an upstream end and a downstream end, the pipelined system comprising:

(a) first memory means for storing instructions, at least one of the instructions having plural operand specifiers that specify operand data further stored in the first memory means;

(b) D-stage means, coupled to the first memory means, for receiving instruction signals from the first memory means and decoding the received instruction signals into one or more microinstruction specifying signals and one or more operand specifying signals;

(c) specifier translating means, coupled to the D-stage means, for converting each operand specifying signal into an operand-specifying physical address signal;

(d) B-stage means including a second memory means for storing a cache copy of operand data corresponding to the operand data of the first memory means, said B-stage means being coupled to receive the operand-specifying physical address signals output by the specifier translating means and to output correspondingly addressed ones of the cache copy operand data stored in the second memory means;

(e) first X-stage means, coupled to receive the output ones of the cache copy operand data and to further receive execution flow control instructions, for performing first data processing operations in accordance with the execution flow control instructions and the received ones of the cache copy operand data and for outputting an outflow of data items derived from said first data processing operations;

(f) data selecting/combining means having a first input for receiving the outflow of data items from the first X-stage means, a second input for receiving a flow of side-tracked data items, and an output, the data selecting/combining means being for selectively outputting in accordance with a supplied first control signal, either one of the data item outflows at its respective first and second inputs or a parallel combination derived from both outflows;

(g) sidetrack pipe means having a copy-making input for making and storing copies of the data items outflowing from the first X-stage means and an output for outputting the copied and stored data items, said output of the sidetrack pipe means being coupled to the second input of the data selecting/combining means; and (h) second X-stage means, coupled to receive the output of the data selecting/combining means and to further receive the execution flow control instructions, for performing second data processing operations in accordance with the execution flow control instructions and the received output of the data selecting/combining means and for outputting an outflow of result data and plural control signals derived from said second data processing operations, said plural control signals including the first control signal supplied to the data selecting/combining means.

17. A pipelined system according to claim 16 wherein said plural control signals output by the second X-stage means includes a second control signal that is coupled to the sidetrack pipe means for selectively advancing the output of the sidetrack pipe means.

18. A pipelined system according to claim 17 wherein said plural control signals output by the second X-stage means includes a third control signal that is coupled to the specifier translating means for selectively advancing the address represented by the output of the specifier translating means.

19. A pipelined system according to claim 16 further comprising:

(i) first flow-control means, operatively coupled to the B-stage means, for causing the cache copy operand data thereof to be output in accordance with a predefined first flow sequence; and (j) second flow-control means, operatively coupled to the second X-stage means, for directing the second X-stage means to process the output of the data selecting/combining means in accordance with a second flow sequence that is at times different from the predefined first flow sequence of the first flow-control means;

wherein the sidetrack pipe means is used for sidetracking data items within the outflow of data items from the first X-stage means that are positioned prematurely with respect to the second flow sequence, and wherein the data selecting/combining means is used for inserting into the inflow of the second X-stage means sidetracked ones of the data items so as to conform with the second flow sequence.

20. A pipelined system according to claim 19 wherein the first and second flow-control means include means for carrying out one or both of an EDIT and EDMK instruction.

* * * * *